(12) United States Patent
Imanishi et al.

(10) Patent No.: US 8,597,848 B2
(45) Date of Patent: Dec. 3, 2013

(54) FUEL CELL SYSTEM, ESTIMATION DEVICE OF AMOUNT OF ANODE GAS TO BE GENERATED AND ESTIMATION METHOD OF AMOUNT OF ANODE GAS TO BE GENERATED

(75) Inventors: Hiroyuki Imanishi, Toyota (JP); Kota Manabe, Toyota (JP); Tomoya Ogawa, Toyota (JP); Go Tejima, Toyota (JP); Yoshiaki Naganuma, Nissin (JP); Hironori Noto, Tokai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1406 days.

(21) Appl. No.: 11/992,587

(22) PCT Filed: Oct. 20, 2006

(86) PCT No.: PCT/JP2006/321437
§ 371 (c)(1),
(2), (4) Date: Mar. 26, 2008

(87) PCT Pub. No.: WO2007/046545
PCT Pub. Date: Apr. 26, 2007

(65) Prior Publication Data
US 2009/0269628 A1    Oct. 29, 2009

(30) Foreign Application Priority Data

Oct. 21, 2005  (JP) .................................. 2005-307021
May 9, 2006    (JP) .................................. 2006-130480

(51) Int. Cl.
*H01M 8/06*     (2006.01)
*H01M 8/04*     (2006.01)
*H01M 2/38*     (2006.01)
*H01M 2/40*     (2006.01)
*H01M 8/24*     (2006.01)

(52) U.S. Cl.
USPC ............ 429/444; 429/416; 429/455; 429/456

(58) Field of Classification Search
USPC .................................. 429/416, 444, 455, 456
See application file for complete search history.

(56) References Cited

U.S. PATENT DOCUMENTS

| | | | |
|---|---|---|---|
| 5,366,821 A * | 11/1994 | Merritt et al. ................. | 429/422 |
| 2003/0077488 A1* | 4/2003 | Yamamoto et al. ............. | 429/17 |
| 2004/0072042 A1 | 4/2004 | Kim | |
| 2005/0112437 A1* | 5/2005 | Collins .......................... | 429/32 |
| 2005/0129990 A1* | 6/2005 | Ozeki et al. ..................... | 429/12 |
| 2005/0164057 A1 | 7/2005 | Pospichal et al. | |
| 2005/0227126 A1 | 10/2005 | Korytnikov et al. | |

FOREIGN PATENT DOCUMENTS

| | | |
|---|---|---|
| DE | 693 02 902 T2 | 12/1996 |
| DE | 102 49 183 A1 | 7/2003 |
| JP | 64-59777 A | 3/1989 |
| JP | 03-081970 A | 4/1991 |

(Continued)

*Primary Examiner* — Eugenia Wang
(74) *Attorney, Agent, or Firm* — Kenyon & Kenyon LLP

(57) ABSTRACT

There is disclosed a fuel cell system or the like capable of sufficiently reducing an exhaust hydrogen concentration even in a case where a fuel cell is operated in a state of a low power generation efficiency. A bypass valve is arranged between an oxidation gas supply path and a cathode-off gas channel. In a state in which supply of an oxidation gas to a cathode falls short, pumping hydrogen is included in a cathode-off gas. Therefore, a valve open degree of the bypass valve is regulated, and a flow rate of bypass air is regulated to control the exhaust hydrogen concentration.

7 Claims, 14 Drawing Sheets

(56) References Cited

FOREIGN PATENT DOCUMENTS

| JP | 2002-289243 A | 10/2002 |
| JP | 2003-504807 A | 2/2003 |
| JP | 2003-294676 A | 10/2003 |
| JP | 2004-172027 A | 6/2004 |
| JP | 2005-71626 A | 3/2005 |
| JP | 2005-108815 A | 4/2005 |
| JP | 2005-294118 A | 10/2005 |
| JP | 2006-73501 A | 3/2006 |
| JP | 2007-280771 A | 10/2007 |

* cited by examiner

<USUAL OPERATION>

<LOW-EFFICIENCY OPERATION>

| CONDITIONS | CONTROL CONTENTS |
|---|---|
| $Dh > Dth1$ | AIR FLOW RATE up |
| $Dth2 \leq Dh \leq Dth1$ | — |
| $Dh < Dth2$ | AIR FLOW RATE down |

FUEL CELL SYSTEM, ESTIMATION DEVICE OF AMOUNT OF ANODE GAS TO BE GENERATED AND ESTIMATION METHOD OF AMOUNT OF ANODE GAS TO BE GENERATED

This is a 371 national phase application of PCT/JP2006/321437 filed 20 Oct. 2006, which claims priority of Japanese Patent Applications No. 2005-307021 filed 21 Oct. 2005, and No. 2006-130480 filed 9 May 2006, respectively, the contents of which are incorporated herein by reference.

TECHNICAL FIELD

The present invention relates to a fuel cell system, and a technology for estimating an amount of an anode gas to be generated in a cathode of a fuel cell.

BACKGROUND ART

A fuel cell mounted on a fuel cell car and the like generates a power by use of a fuel gas including hydrogen to be supplied to an anode and an oxidation gas including oxygen to be supplied to a cathode. A hydrogen-off gas to be discharged from the fuel cell is mixed and diluted with an oxygen-off gas, and discharged from the car in a state in which a hydrogen concentration is reduced. To discharge such a hydrogen-off gas, the gas needs to be sufficiently diluted so that a high concentration of hydrogen is not discharged (see, e.g., Patent Document 1).

Moreover, to sufficiently dilute the gas so that the high concentration of hydrogen is not discharged, the concentration of the hydrogen-off gas needs to be detected with a good precision. As a method of detecting such an hydrogen-off gas concentration, a method is proposed to install a hydrogen sensor in a cathode-off gas channel through which an oxygen-off gas is circulated and to detect the concentration of the hydrogen-off gas to be discharged from a cathode side by use of the hydrogen sensor (see, e.g., Patent Document 2).

[Patent Document 1] International Patent Application Publication No. 2003-504807
[Patent Document 2] Japanese Patent Application Laid-Open No. 2003-294676

DISCLOSURE OF THE INVENTION

However, in a case where a fuel cell is operated in a state of a low power generation efficiency, not only hydrogen is discharged from an anode but also hydrogen (mainly pumping hydrogen) is discharged from a cathode, and hydrogen in excess of a regulated range is sometimes discharged from a system.

Moreover, the above conventional detection method of a concentration of a hydrogen-off gas has a problem that the concentration cannot be detected until the hydrogen-off gas reaches a hydrogen sensor and that much time is required for the detection.

In view of the above-mentioned situation, the present invention has been developed, and an object thereof is to provide a fuel cell system capable of sufficiently reducing an exhaust hydrogen concentration even in a case where a fuel cell is operated in a state of a low power generation efficiency. Furthermore, an object of the present invention is to provide a technology capable of quickly and correctly obtaining a concentration of a hydrogen-off gas to be discharged from the side of a cathode.

To solve the above-mentioned problem, a fuel cell system according to the present invention is a fuel cell system which selectively executes an operation with a first efficiency and an operation with a second efficiency lower than the first efficiency (hereinafter referred to as the low-efficiency operation) and which is characterized by comprising regulation means for regulating a dilution amount of the gas to be discharged from a cathode in accordance with a gas amount of an anode gas included in the gas to be discharged from the cathode of the fuel cell.

Here, in the above constitution, it is a preferable configuration that the anode gas included in the gas to be discharged from the cathode is a hydrogen gas to be generated in the cathode of the fuel cell during the low-efficiency operation, the system further comprises a bypass passage which allows a part of the cathode gas flowing through a gas supply path of the fuel cell to pass by the fuel cell and which introduces the part into a discharge passage, and the regulation means comprises a bypass valve which controls a gas amount of the cathode gas to be bypassed in accordance with a gas amount of a hydrogen gas included in the gas to be discharged from the cathode of the fuel cell.

Moreover, in the above constitution, it is a preferable configuration that the regulation means controls the gas amount of the cathode gas to be bypassed so that a discharge concentration of hydrogen to be discharged from the system is not more than a reference value.

Furthermore, in the above constitution, it is a preferable configuration that the cathode gas to be supplied to the cathode of the fuel cell is an oxidation gas including oxygen, and the system further comprises an oxidation gas supply source which discharges the oxidation gas in accordance with a given instruction; and control means for controlling an amount of the oxidation gas to be discharged by the oxidation gas supply source based on an amount of the oxidation gas required for power generation of the fuel cell and an amount of the oxidation gas allowed to pass by the fuel cell.

In addition, in the constitution, it is a preferable configuration that the control means comprises a pressure regulation valve which controls the gas amount of the oxidation gas to be supplied from the oxidation gas supply source to the cathode of the fuel cell and that during the low-efficiency operation, in a case where the amount of the hydrogen gas to be generated in the cathode of the fuel cell is not more than the reference value, the regulation means fully closes the bypass valve whereas the control means controls the amount of the oxidation gas to be discharged while keeping an open degree of the pressure regulation valve to be constant in accordance with the amount of the oxidation gas required for the power generation of the fuel cell.

Moreover, in the above constitution, it is a preferable configuration that the oxidation gas supply source is an air compressor and that the control means controls the amount of the oxidation gas to be discharged while keeping the pressure regulation valve to be fully opened in accordance with the amount of the oxidation gas required for the power generation of the fuel cell.

Furthermore, in the above constitution, a preferable configuration further comprises estimation means for estimating the gas amount of the hydrogen gas to be generated in the cathode of the fuel cell during the low-efficiency operation.

In addition, in the above constitution, it is a preferable configuration that the estimation means estimates the amount of hydrogen based on an output current of the fuel cell, an air stoichiometric ratio of the fuel cell and a temperature of the fuel cell.

Moreover, an estimation method of an amount of hydrogen to be generated according to the present invention is an estimation method of a gas amount of a hydrogen gas to be generated in a cathode of a fuel cell during a low-efficiency operation, comprising: a first estimation step of estimating an air stoichiometric ratio of the fuel cell based on an output voltage and an output current of the fuel cell; and a second estimation step of estimating the gas amount of the hydrogen gas to be generated in the cathode of the fuel cell based on the output current, the air stoichiometric ratio and a temperature of the fuel cell.

Furthermore, an estimation device of an amount of a gas to be generated according to the present invention is an estimation device of the amount of the gas to be generated which estimates an amount of an anode gas to be generated in a cathode of a fuel cell, and is characterized by comprising: operation control means for operating the fuel cell at a low-efficiency operation point having a power loss larger than that of a usual operation point in a case where predetermined conditions are satisfied; and estimation means for estimating the amount of the anode gas to be generated in the cathode based on a power generation characteristic of the fuel cell in a case where the fuel cell is operated at the low-efficiency operation point.

Here, in the above constitution, it is a preferable configuration that the estimation means estimates the amount of the anode gas to be generated in consideration of at least one of a remaining amount of a non-reacted cathode gas which remains on a cathode side of the fuel cell and fluctuations of pressure losses of cells constituting the fuel cell, together with the power generation characteristic of the fuel cell and an amount of a cathode gas to be supplied to the fuel cell.

Moreover, in the above constitution, it is a preferable configuration that the estimation means estimates the amount of the anode gas to be generated in consideration of both the remaining amount of the non-reacted cathode gas and the fluctuations of the pressure losses of the cells.

Furthermore, in the above constitution, a preferable configuration further comprises a voltage monitor which detects an output voltage of the fuel cell, and the estimation means estimates the amount of the anode gas to be generated in the cathode based on the output voltage detected by the voltage monitor.

In addition, in the above constitution, it is a preferable configuration that the voltage monitor detects a cell voltage of each of the cells, the estimation means includes a reference function which indicates a relation between the cell voltage of a reference cell and the amount of the anode gas to be generated, and the estimation means estimates the amount of the anode gas to be generated in the cathode by use of the cell voltage of each cell detected by the voltage monitor and the reference function.

Moreover, in the above constitution, it is a preferable configuration that the operation control means operates the fuel cell at the low-efficiency operation point in a case where the fuel cell needs to be warmed up or in a case where a catalyst activity of the fuel cell needs to be restored.

Furthermore, in the above constitution, it is a preferable configuration that the anode gas to be generated in the cathode is hydrogen.

In addition, an estimation method of an amount of an anode gas to be generated according to the present invention is an estimation method of an amount of an anode gas to be generated in a cathode of a fuel cell, comprising: an operation control step of operating the fuel cell at a low-efficiency operation point having a pressure loss larger than that of a usual operation point in a case where a predetermined condition is satisfied; and an estimation step of estimating the amount of the anode gas to be generated in the cathode based on a power generation characteristic of the fuel cell in a case where the fuel cell is operated at the low-efficiency operation point.

Here, in the above constitution, it is a preferable configuration that the estimation step estimates the amount of the anode gas to be generated in consideration of at least one of a remaining amount of a non-reacted cathode gas which remains on a cathode side of the fuel cell and fluctuations of pressure losses of cells constituting the fuel cell, together with the power generation characteristic of the fuel cell and an amount of a cathode gas to be supplied to the fuel cell.

Moreover, in the above constitution, it is a preferable configuration that the estimation step estimates the amount of the anode gas to be generated in the cathode based on an output voltage of the fuel cell detected by a voltage monitor.

As described above, according to the present invention, even in a case where the fuel cell is operated in a state of a low power generation efficiency, an exhaust hydrogen concentration can sufficiently be reduced. According to the present invention, the concentration of the hydrogen-off gas or the like to be discharged from the cathode side can quickly and correctly be obtained.

BEST MODE FOR CARRYING OUT THE INVENTION

Embodiments according to the present invention will hereinafter be described with reference to the drawings.

A. First Embodiment

Figure 1:
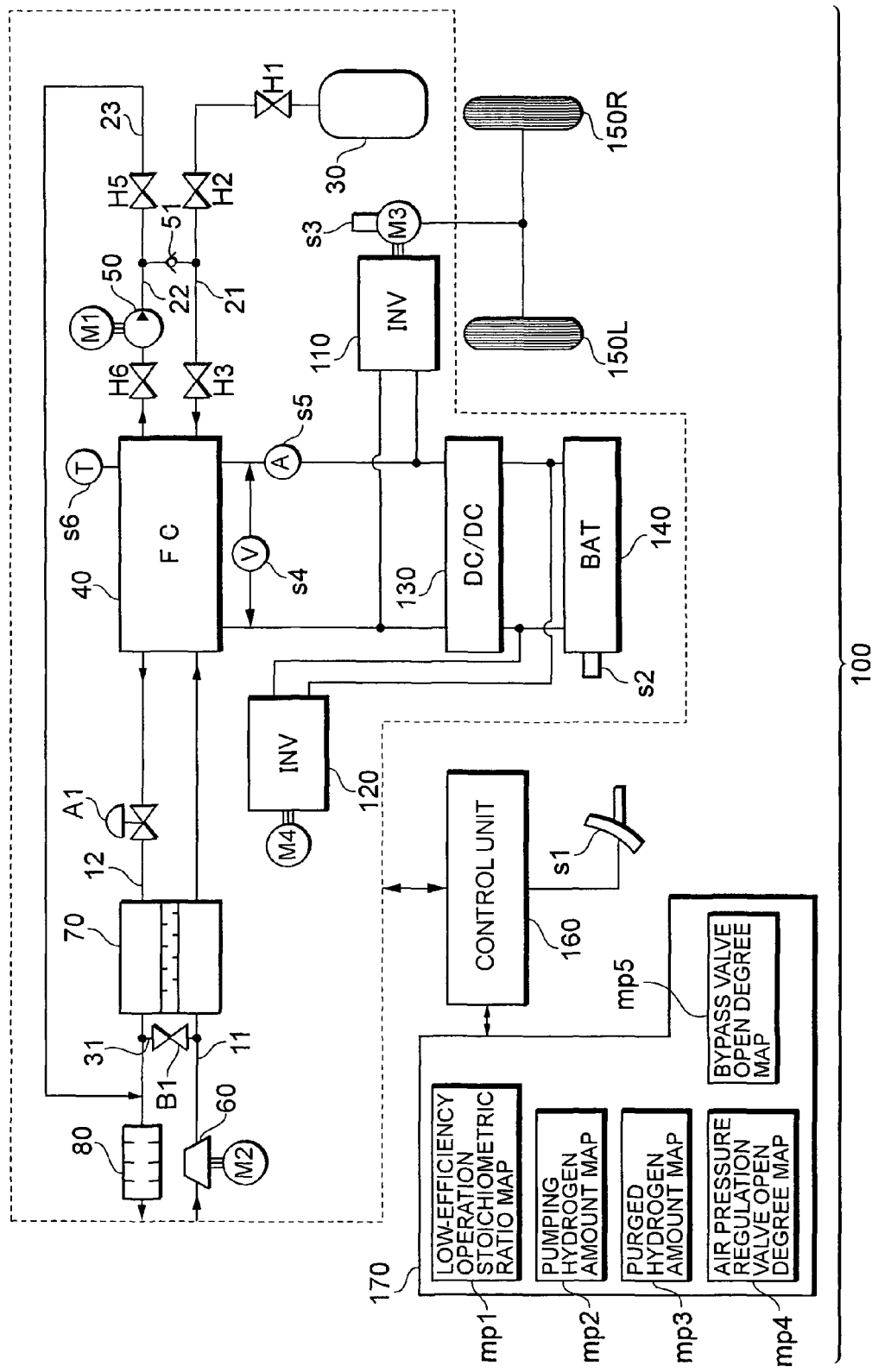
FIG. 1 is a diagram showing a constitution of a fuel cell system according to a first embodiment.

FIG. 1 is a diagram showing a constitution of a main part of a fuel cell system 100 according to the present embodiment. In the present embodiment, a fuel cell system is assumed which is to be mounted on vehicles such as a fuel cell car (FCHV), an electric car and a hybrid car, but the system is also applicable to not only the vehicles but also various mobile objects (e.g., a ship, an airplane, a robot, etc.) and a stationary power source.

The fuel cell system 100 includes a fuel gas circulation supply system and an oxidation gas supply system.

The fuel gas circulation supply system includes a fuel gas supply source 30, a fuel gas supply path 21, a fuel cell 40, a fuel gas circulation path 22 and an anode-off gas channel 23, and the oxidation gas supply system includes an air compressor 60, an oxidation gas supply path 11 and a cathode-off gas channel 12.

The fuel cell 40 is means for generating a power from a supplied reactive gas (a fuel gas and an oxidation gas), and has a stack structure in which a plurality of single cells including an MEA (a film/electrode bonded material) and the like are laminated in series. Specifically, fuel cells of various types such as a solid polymer type, a phosphoric acid type and a dissolving carbonate type may be used.

The fuel gas supply source 30 is means for supplying a fuel gas such as a hydrogen gas to the fuel cell 40, and includes, for example, a high-pressure hydrogen tank, a hydrogen storage tank and the like. The fuel gas supply path 21 is a gas channel which introduces the fuel gas to be discharged from the fuel gas supply source 30 into an anode pole of the fuel cell 40, and the gas channel is provided with valves such as a tank valve H1, a hydrogen supply valve H2 and an FC inlet valve H3 from upstream to downstream. The tank valve H1, the hydrogen supply valve H2 and the FC inlet valve H3 are shut valves for supplying (or shutting off) the fuel gas to the gas channels 21 to 23 or the fuel cell 40, and the valves include, for example, electromagnetic valves.

The fuel gas circulation path 22 is a return gas channel for returning a non-reacted fuel gas to the fuel cell 40, and the gas channel is provided with an FC outlet valve H6, a hydrogen pump 50 and a check valve 51 from upstream to downstream, respectively. A low-pressure non-reacted fuel gas discharged from the fuel cell 40 is appropriately pressurized by the hydrogen pump 50, and introduced into the fuel gas supply path 21. It is to be noted that a counter flow of the fuel gas from the fuel gas supply path 21 to the fuel gas circulation path 22 is suppressed by the check valve 51.

The anode-off gas channel 23 is a gas channel for exhausting an anode-off gas including a hydrogen-off gas discharged from the fuel cell 40 to the outside of the system, and the gas channel is provided with a purge valve H5.

The air compressor 60 supplies oxygen (an oxidation gas) taken from outside air via an air filter (not shown) to a cathode pole of the fuel cell 40. A cathode-off gas is discharged from a cathode of the fuel cell 40. The cathode-off gas includes pumping hydrogen to be generated on a cathode side and the like, in addition to an oxygen-off gas subjected to a cell reaction of the fuel cell 40 (details will be described later). Since this cathode-off gas includes a water content generated by a fuel reaction of the fuel cell 40, the gas is brought into a highly wet state.

A humidification module 70 exchanges the water content between a less wet oxidation gas flowing through the oxidation gas supply path 11 and a highly wet cathode-off gas flowing through the cathode-off gas channel 12 to appropriately humidify the oxidation gas to be supplied to the fuel cell 40. A back pressure of the oxidation gas to be supplied to the fuel cell 40 is regulated by an air pressure regulation valve A1 arranged in the vicinity of a cathode outlet of the cathode-off gas channel 12.

Here, the oxidation gas supply path 11 extending from the air compressor 60 to the humidification module 70 is connected to the cathode-off gas channel 12 extending from the humidification module 70 to a dilution unit 80 via a bypass valve B1. The bypass valve B1 and a bypass passage 31 are means for allowing a part of the oxidation gas flowing through the oxidation gas supply path 11 to pass by the fuel cell 40 and introducing the part into the cathode-off gas channel 12, and an amount of the oxidation gas to be bypassed is regulated by a control unit (regulation means) 160. It is to be noted that in the following description, the oxidation gas to be bypassed is referred to as bypass air.

The dilution unit 80 dilutes the gas so that the discharge concentration of the hydrogen gas falls in a preset concentration range (a range determined based on an environment standard or the like). This dilution unit 80 communicates with downstream sides of the cathode-off gas channel 12 and the anode-off gas channel 23, and mixes and dilutes the hydrogen-off gas, pumping hydrogen, oxygen-off gas and bypass air to exhaust the gas from the system.

A pressure of a part of a direct-current power generated in the fuel cell 40 is raised and lowered by a DC/DC converter 130 to charge a battery 140.

The battery 140 is a chargeable and dischargeable secondary battery, and includes various types of secondary batteries (e.g., a nickel hydrogen battery, etc.). Needless to say, instead of the battery 140, a chargeable and dischargeable power storage unit other than the secondary battery, for example, a capacitor may be used.

A traction inverter 110 and an auxiliary machine inverter 120 are PWM inverters of a pulse width modulation system, and convert the direct-current power output from the fuel cell 40 or the battery 140 into a three-phase alternating-current power in accordance with a given control instruction to supply the power to a traction motor M3 and an auxiliary machine motor M4.

The traction motor M3 is a motor which drives wheels 150L, 150R, and the auxiliary machine motor M4 is a motor which drives various auxiliary machines. It is to be noted that the auxiliary machine motor M4 generically refers to a motor M1 which drives the hydrogen circulation pump 50, a motor M2 which drives the air compressor 60 and the like.

The control unit (regulation means) 160 includes a CPU, an ROM, an RAM and the like, and centrally controls sections of the system based on input sensor signals. Specifically, the unit controls output pulse widths and the like of the inverters 110, 120 based on sensor signals input from an accelerator pedal sensor s1 which detects an open degree of an accelerator pedal, an SOC sensor s2 which detects a state of charge (SOC) of the battery 140, a T/C motor revolution number detecting sensor s3 which detects the number of revolutions of the traction motor M3, and a voltage sensor s4, a current sensor s5, a temperature sensor s6 and the like which detect an output voltage, an output current and an internal temperature of the fuel cell 40, respectively.

Moreover, the control unit 160 performs an operation with a low power generation efficiency by use of maps mp1 to mp5 stored in a memory 170, in a case where the fuel cell 40 needs to be warmed up during start at a low temperature or the like.

Figure 2:
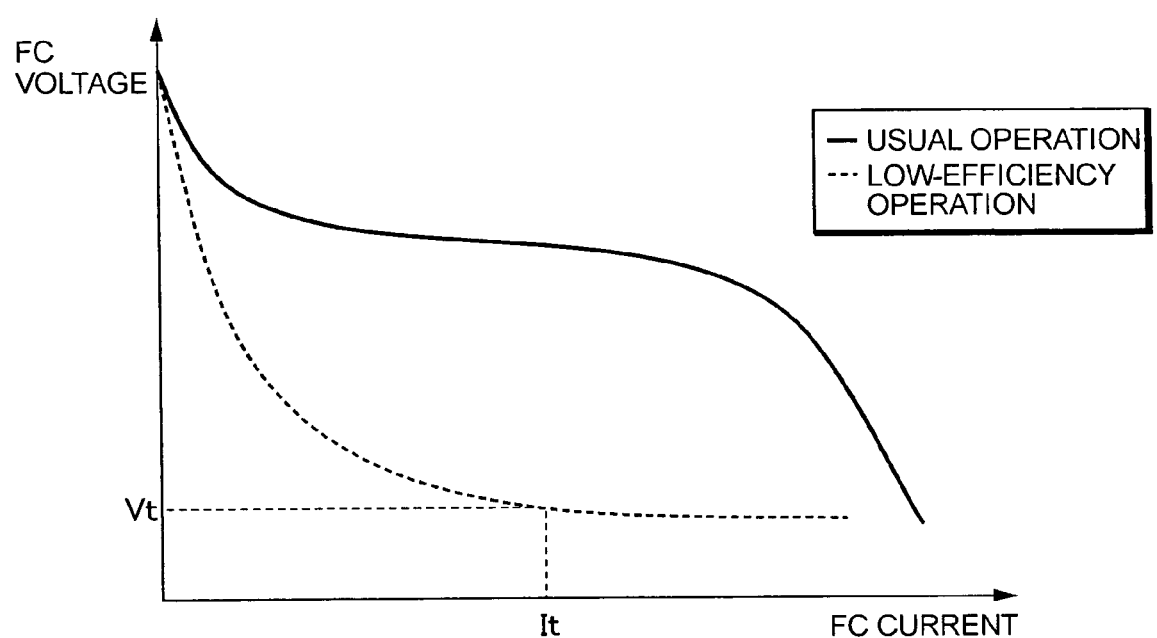
FIG. 2 is a diagram showing a relation between an FC current and an FC voltage according to the embodiment.

FIG. 2 is a diagram showing a relation between an output current (an FC current) and an output voltage (an FC voltage) of the fuel cell. A case where an operation with a high power generation efficiency (a usual operation; an operation with a first efficiency) is performed is shown by a solid line, and a case where the amount of the oxidation gas is reduced to perform an operation with a low power generation efficiency (an operation with a low efficiency; an operation with a second efficiency lower than the first efficiency) is shown by a dot line. It is to be noted that the abscissa indicates the FC current and the ordinate indicates the FC voltage.

Usually, in a case where the fuel cell 40 is operated, the fuel cell 40 is operated in a state in which an air stoichiometric ratio is set to 1.0 or more (a theoretical value) so as to suppress power losses and obtain the high power generation efficiency (see a solid-line part of FIG. 2). Here, the air stoichiometric ratio is an excess ratio of an actual air supply amount with respect to a theoretical air supply amount required for generating the FC current.

On the other hand, when the fuel cell 40 is warmed up, the fuel cell 40 is operated in a state in which the air stoichiometric ratio is set around 1.0 (a theoretical value) in order to increase the power losses and raise a temperature of the fuel cell 40 (see a dot-line part of FIG. 2). In a case where the air stoichiometric ratio is set to be low to operate the fuel cell, in relation to energy to be taken out by a reaction between hydrogen and oxygen, energy which compensates for the power losses (i.e., heat losses) is positively increased. Therefore, the cell can quickly be warmed up. On the other hand, pumping hydrogen is generated in the cathode.

Figure 3A:
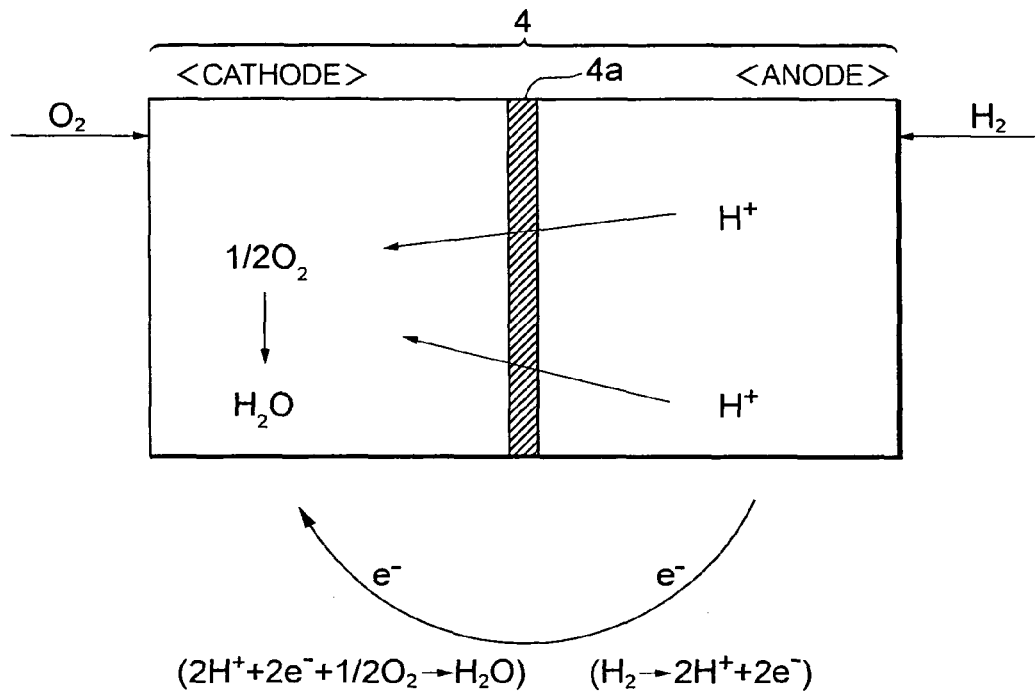
FIG. 3A is a diagram showing a cell reaction during a usual operation according to the embodiment.
Figure 3B:
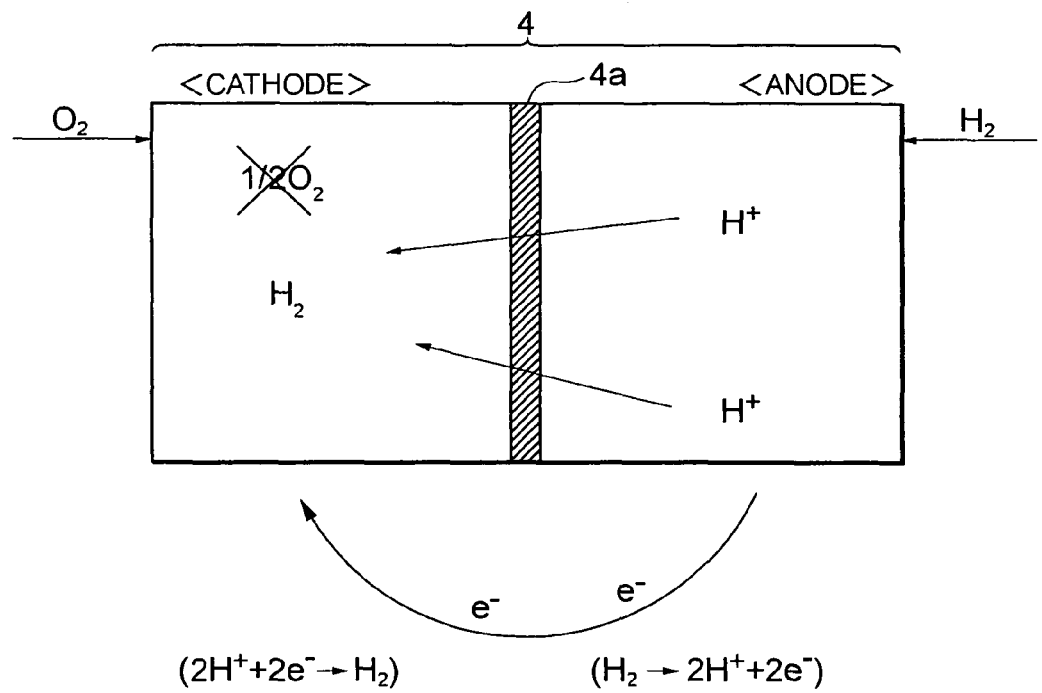
FIG. 3B is a diagram showing a cell reaction during a low-efficiency operation according to the embodiment.

FIG. 3 is an explanatory view of a generation mechanism of pumping hydrogen, FIG. 3A is a diagram showing a cell reaction during a usual operation, and FIG. 3B is a diagram showing a cell reaction during a low-efficiency operation.

Each of cells 4 includes an electrolytic film 4a, and an anode electrode and a cathode electrode which nip this electrolytic film 4a. A fuel gas including hydrogen ($H_2$) is supplied to an anode, and an oxidation gas including oxygen ($O_2$) is supplied to a cathode. When the fuel gas is supplied to the anode, a reaction of the following formula (A) progresses, and hydrogen is dissociated into a hydrogen ion and an electron. The hydrogen ion generated in the anode penetrates the electrolytic film 4a to move to the cathode, whereas the electron passes through an external circuit from the anode to move to the cathode.

Here, in a case where the oxidation gas is sufficiently supplied to the cathode (the air stoichiometric ratio≥1.0), a reaction of the following formula (B) progresses to generate water from oxygen, the hydrogen ion and the electron (see FIG. 3A). On the other hand, in a case where the oxidation gas is insufficiently supplied to the cathode (the air stoichiometric ratio<1.0), a reaction of the following formula (C) progresses in accordance with an amount of a lacking oxidation gas, and the hydrogen ion is bonded to the electron again to generate hydrogen (see FIG. 3). The generated hydrogen is discharged from the cathode together with the oxygen-off gas. It is to be noted that hydrogen to be generated in the cathode by bonding the dissociated hydrogen ion and electron to each other again, that is, the anode gas to be generated in the cathode is referred to as pumping hydrogen.

$$\text{anode: } H_2 \rightarrow 2H^+ + 2e^- \quad (A);$$

$$\text{cathode: } 2H^+ + 2e^- + (1/2)O_2 \rightarrow H_2O \quad (B); \text{ and}$$

$$\text{cathode: } 2H^+ + 2e^- \rightarrow H_2 \quad (C).$$

In a state in which the supply of the oxidation gas to the cathode falls short in this manner, pumping hydrogen is included in the cathode-off gas. Therefore, in the present embodiment, a flow rate of bypass air is regulated in accordance with an amount of pumping hydrogen included in the cathode-off gas to control an exhaust hydrogen concentration. An operation of the fuel cell system 100 during the low-efficiency operation will hereinafter be described.

Figure 4:
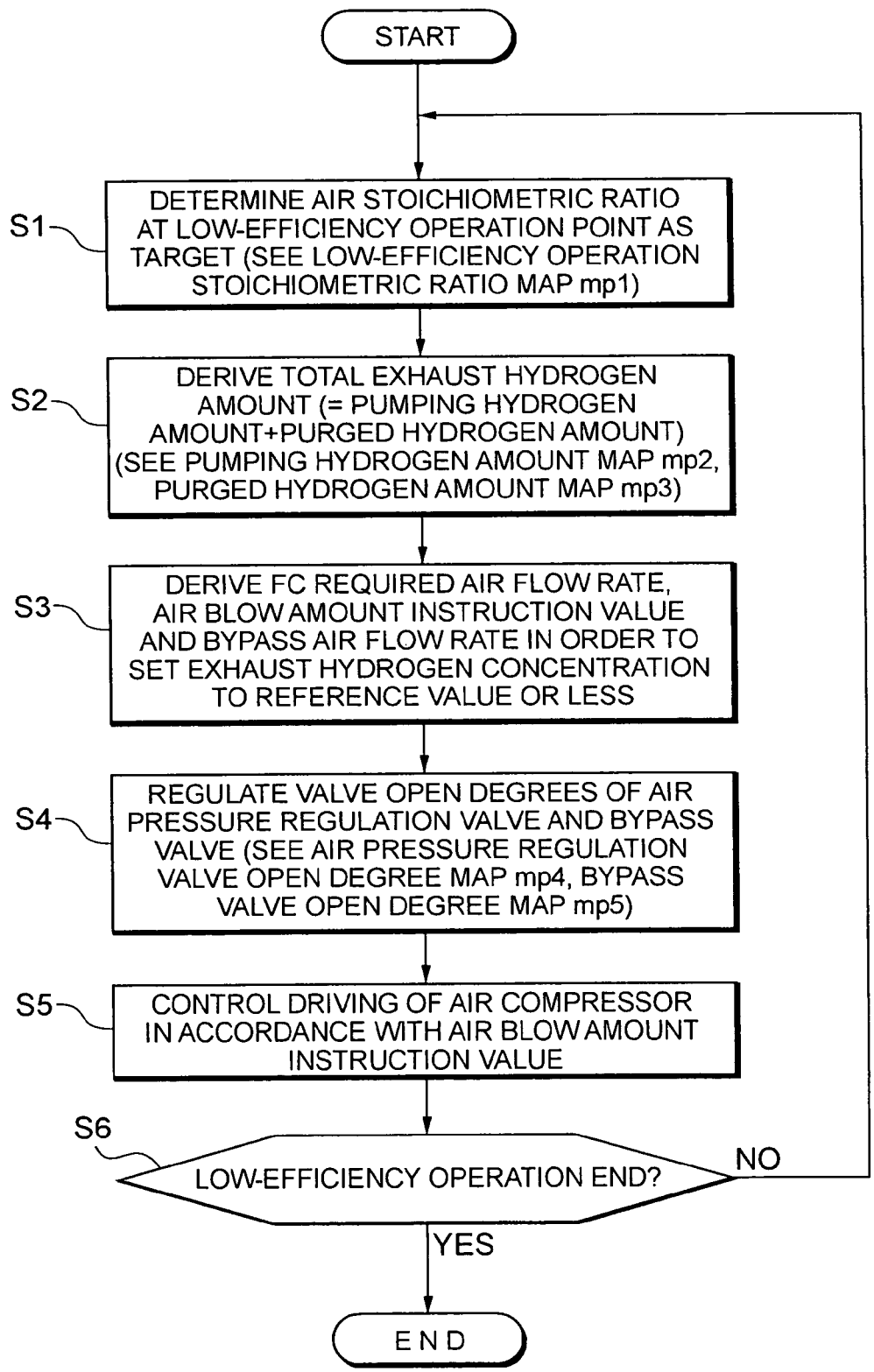
FIG. 4 is a flow chart showing an operation during the low-efficiency operation according to the embodiment.

FIG. 4 is a flow chart showing an operation of the fuel cell system during the low-efficiency operation.

After determining a low-efficiency operation point (It, Vt) as a target in accordance with a warm-up temperature and the like (see FIG. 2), the control unit 160 refers to the low-efficiency operation stoichiometric ratio map mp1 stored in the memory 170. The low-efficiency operation stoichiometric ratio map mp1 determines the air stoichiometric ratio from an FC current instruction value It and an FC voltage instruction value Vt, and is prepared on the basis of a value obtained by an experiment and the like. The control unit 160 determines an air stoichiometric ratio Ra at the operation point by use of the determined FC current instruction value It, FC voltage instruction value Vt and low-efficiency operation stoichiometric ratio map mp1 (step S1).

When determining the air stoichiometric ratio Ra, the control unit 160 refers to the pumping hydrogen amount map mp2 and the purged hydrogen amount map mp3 stored in the memory 170. With reference to the pumping hydrogen amount map mp2, the amount (a pumping hydrogen amount) of pumping hydrogen to be generated is estimated from the FC current instruction value It, the determined air stoichiometric ratio Ra and the temperature of the fuel cell 40 detected by the temperature sensor s6, and the map is prepared on the basis of the value obtained by the experiment or the like. The purged hydrogen amount map mp3 is a map for estimating a discharge amount (a purged hydrogen amount) of the anode-off gas including the hydrogen-off gas from the FC current.

The control unit 160 estimates a pumping hydrogen amount Ap1 by use of the determined FC current instruction value It, the air stoichiometric ratio Ra, the temperature of the fuel cell 40 and the pumping hydrogen amount map mp2. On the other hand, a purged hydrogen amount Ap2 is estimated by use of the determined FC current instruction value It and the purged hydrogen amount map mp3, and a total exhaust hydrogen amount At is obtained at the low-efficiency operation point (It, Vt) as a target (step S2; see the following equation (1)).

$$At = Ap1 + Ap2 \quad (1)$$

On obtaining the total exhaust hydrogen amount At, the control unit 160 derives an FC required air flow rate required for setting the exhaust hydrogen concentration to be not more than a reference value, an air sweep amount instruction value and a bypass air flow rate (step S3). Specifically, the air flow rate (the FC required air flow rate) An required for the fuel cell 40 is obtained by use of the following equation (2).

$$An = It * \{400 * 22.4 * 60 / (4 * 96485)\} * 100 / 21 \quad (2)$$

Next, the control unit 160 obtains an air flow rate (an FC consumed air flow rate) Ac to be consumed by the fuel cell 40 by use of the following equation (3), and obtains an air flow rate (a total air flow rate) Ad required for diluting the gas so as to set the exhaust hydrogen concentration to be not more than the reference value by use of the following equation (4).

$$Ac=It*400*22.4*60/(4*96485) \quad (3); and$$

$$Ad=(At*100/Dt)+Ac \quad (4),$$

in which Dt; a target concentration (%) of exhaust hydrogen.

Furthermore, the control unit (regulation means) 160 compares a value obtained by adding a minimum bypass air flow rate Abl to the FC required air flow rate An with the total air flow rate Ad, and the unit sets a larger value as an air blow amount instruction value Asp of the air compressor 60 (see the following equation (5)). Moreover, the set air blow amount instruction value Asp and FC required air flow rate An are substituted into the following equation (6) to obtain a bypass air flow rate Abp. It is to be noted that the minimum bypass air flow rate Abl indicates a minimum value of the flow rate of the air to be passed through the bypass line 31 during the low-efficiency operation.

$$Asp=MAX\{(An+Abl),(Ad)\} \quad (5); and$$

$$Abp=Asp-An \quad (6).$$

On obtaining the FC required air flow rate An and the bypass air flow rate Abp, the control unit 160 refers to the air pressure regulation valve open degree map mp4 and the bypass valve open degree map mp5. The air pressure regulation valve open degree map mp4 is a map for determining a valve open degree of the air pressure regulation valve A1 from the FC required air flow rate An and the bypass air flow rate Abp, and the bypass valve open degree map mp5 is a map for determining a valve open degree of the bypass valve B1 from the FC required air flow rate An and the bypass air flow rate Abp.

The control unit 160 regulates the valve open degrees of the air pressure regulation valve A1 and the bypass valve B1 by use of the FC required air flow rate An, the bypass air flow rate Abp, the air pressure regulation valve open degree map mp4 and the bypass valve open degree map mp5 (step S4). At this time, the valve open degree of the air pressure regulation valve A1 is corrected with a PID correction term generated from a deviation between a measured value and a target value of the FC current detected by the current meter s5.

Furthermore, on controlling driving of the air compressor 60 in accordance with a set air blow amount instruction value As (step S5), the control unit 160 advances to step S6 to judge whether or not to end the low-efficiency operation (i.e., whether or not to end the warm-up operation of the fuel cell 40). Here, when the temperature of the fuel cell 40 is above a preset reference temperature, the low-efficiency operation is ended. When the temperature is not more than the reference temperature, the control unit returns to the step S1 to continue the above process. Needless to say, the present invention is not limited to this embodiment. The control unit may judge whether or not to end the low-efficiency operation based on an amount of heat to be generated, an operation time of the low-efficiency operation and the like.

As described above, according to the present embodiment, the bypass air flow rate and the like are determined in consideration of not only an amount of purged hydrogen to be discharged from the anode but also an amount of pumping hydrogen to be discharged from the cathode. Therefore, even when the low-efficiency operation is performed, an exhaust hydrogen concentration can sufficiently be reduced, and it is possible to prevent, in advance, a problem that hydrogen in excess of a regulated range is discharged from the system.

<Modification>

(1) In the present embodiment, a case where a power is generated from a fuel cell in a state in which an oxidation gas to be supplied to a cathode falls short has been described above, but instead (or additionally), the power may be generated from the fuel cell in a state in which a fuel gas to be supplied to an anode falls short.

(2) Moreover, in the present embodiment, the oxidation gas to be supplied as a gas for dilution to the cathode has been illustrated, but any gas other than a hydrogen gas may be used.

(3) Furthermore, in the present embodiment, a part of the gas for dilution (the oxidation gas) flowing through a gas supply path is allowed to pass by the fuel cell and is introduced into a discharge passage to reduce an exhaust hydrogen concentration. However, for example, supply means of the gas for dilution may separately be disposed, and the gas for dilution may be introduced from this gas supply means into the discharge passage to reduce the exhaust hydrogen concentration.

(4) In addition, in the present embodiment, a case where a low-efficiency operation is performed during start of a system has been illustrated, but the low-efficiency operation may be performed in, for example, a case where a power required for the system is not more than a predetermined value and a case where an instruction to stop the system is given.

B. Second Embodiment

Figure 5:
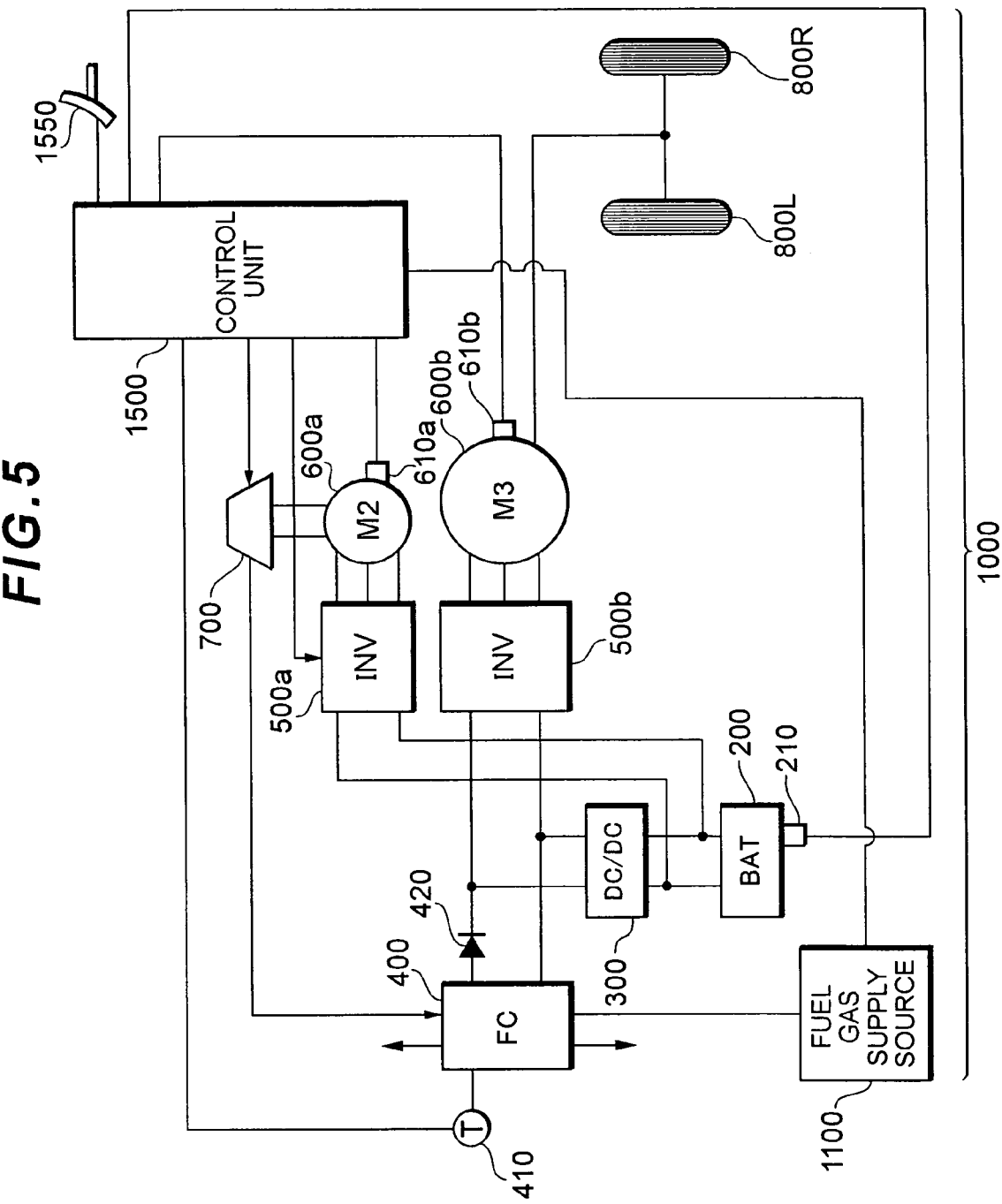
FIG. 5 is a diagram showing a constitution of a fuel cell system according to a second embodiment.

FIG. 5 is a diagram showing a constitution of a main part of a fuel cell system 1000 according to a second embodiment. In the same manner as in the first embodiment described above, also in the second embodiment, the fuel cell system is assumed which is to be mounted on vehicles such as a fuel cell car (FCHV), an electric car and a hybrid car, but the system is also applicable to not only the vehicles but also various mobile objects (e.g., a ship, an airplane, a robot, etc.) and a stationary power source.

A fuel cell 400 is means for generating a power from a supplied reactive gas (a fuel gas and an oxidation gas), and has a stack structure in which a plurality of single cells including an MEA (a film/electrode bonded material) and the like are laminated in series. Specifically, fuel cells of various types such as a solid polymer type, a phosphoric acid type and a dissolving carbonate type may be used. The fuel gas including hydrogen is supplied from a fuel gas supply source 1100 such as a gas tank, a hydrogen occlusion tank or a hydrogen reforming unit to a fuel pole (an anode) of the fuel cell 400, whereas the oxidation gas including air is supplied to an oxygen pole (a cathode) by an air compressor 700.

A battery 200 is a chargeable and dischargeable secondary battery, and includes a secondary battery of any type (e.g., a nickel hydrogen battery or the like). Needless to say, instead of the battery 200, a chargeable and dischargeable power storage unit other than the secondary battery, for example, a capacitor may be used. This battery 200 is interposed in an electric discharge path of the fuel cell 400 via a DC/DC converter 300.

The fuel cell 400 and the battery 200 are connected in parallel with inverters 500a, 500b. A path extending from the fuel cell 400 to the inverters 500a, 500b is provided with a diode 420 which prevents a counter flow of a current from the battery 200.

The inverters 500a, 500b are PWM inverters of a pulse width modulation system, and convert a direct-current power output from the fuel cell 400 or the battery 200 into a three-phase alternating-current power in accordance with a given control instruction to supply the power to motors 600a, 600b.

The air compressor motor 600a is a motor which regulates an amount of the oxidation gas to be supplied by the air compressor 700, and the traction motor 600b is a motor which drives wheels 800L, 800R. It is to be noted that, in addition, a motor, an inverter and the like which drive various types of auxiliary machines (a hydrogen pump and the like) are arranged.

A control unit (operation control means, estimation means) 1500 includes a CPU, an ROM, an RAM and the like, and centrally controls sections of the system based on input sensor signals. Specifically, the unit controls output pulse widths and the like of the inverters 500a, 500b based on sensor signals input from an accelerator pedal sensor 1550 which detects an open degree of an accelerator pedal, an SOC sensor 210 which detects a state of charge (SOC) of the battery 200, a sensor 610a which detects a condition of the air compressor motor 600a, a T/C motor revolution detecting sensor 610b which detects the number of revolutions of the traction motor 600b and the like.

Moreover, the control unit 1500 judges whether or not a warm-up operation is required based on a temperature of the fuel cell 400 detected by a temperature sensor 410. On judging that the warm-up operation is required, the control unit 1500 reduces the oxidation gas to be supplied to the cathode to perform an operation with a low power generation efficiency.

Figure 6A:
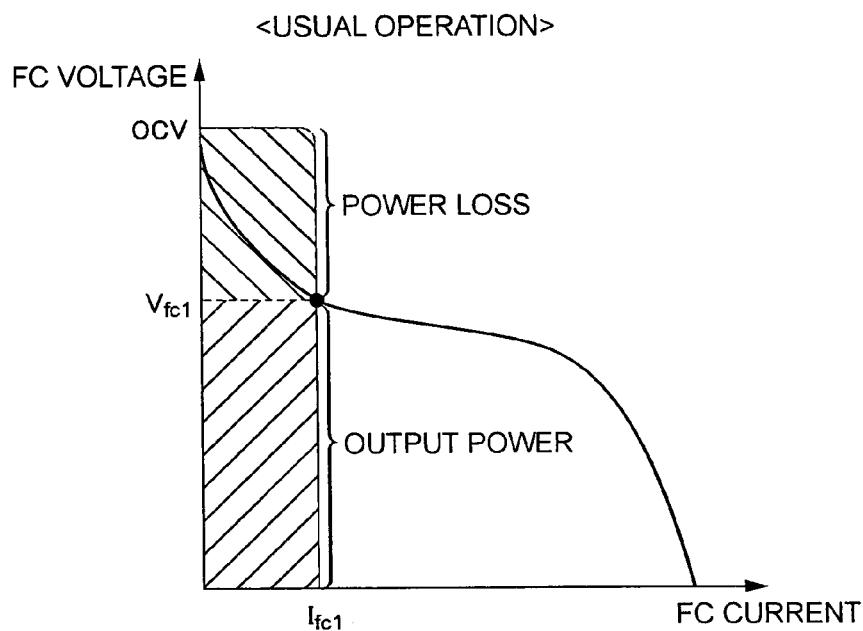
FIG. 6A is a diagram showing a relation between an output power and a power loss during a usual operation according to the embodiment.
Figure 6B:
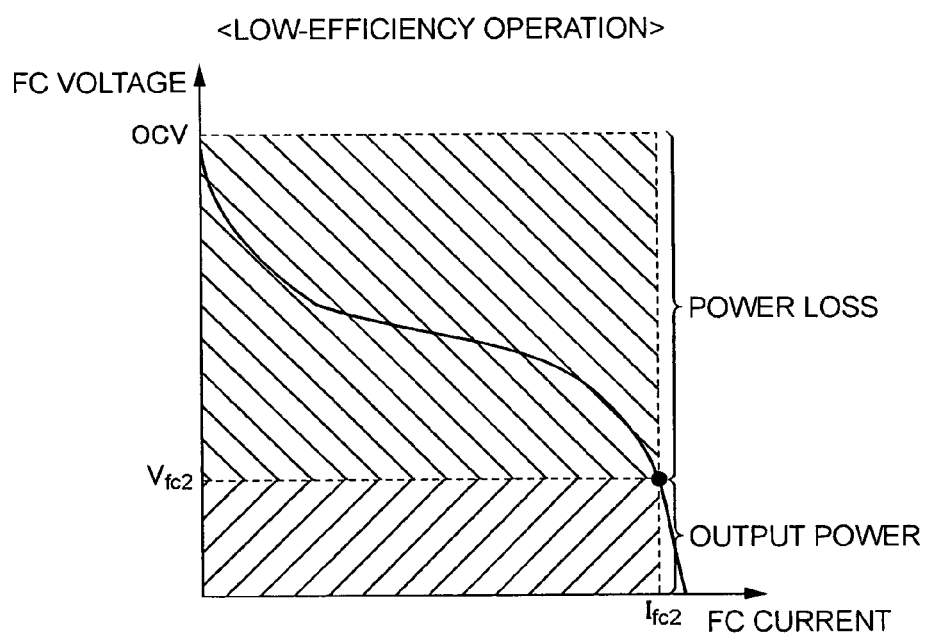
FIG. 6B is a diagram showing a relation between the output power and the power loss during the low-efficiency operation according to the embodiment.

FIG. 6A is a diagram showing a relation between an output power and a power loss at a time when an operation with a high power generation efficiency (a usual operation) is performed, and FIG. 6B is a diagram showing a relation between the output power and the power loss at a time when the operation with the low power generation efficiency (the low-efficiency operation) is performed. It is to be noted that the abscissa indicates an FC current, the ordinate indicates an FC voltage, and an open circuit voltage (OCV) indicates a voltage in a state in which any current is not passed through the fuel cell 400.

In general, in the fuel cell 400 in which current and voltage characteristics (hereinafter referred to as IV characteristics) are obtained as shown in FIG. 6, the control unit 1500 performs an operation at a usual operation point (Ifc1, Vfc1) having a small power loss with respect to the output power (see FIG. 6A).

On the other hand, when the warm-up operation is performed, the control unit (the operation control means) 1500 performs the operation at a low-efficiency operation point (Ifc2, Vfc2) having a large power loss, and raises an internal temperature of the fuel cell 400 (see FIG. 6B). In a process in which such a low-efficiency operation is performed, in relation to energy to be taken out by a reaction between hydrogen and oxygen, energy which compensates for the power losses (i.e., heat losses) is positively increased. Therefore, the cell can quickly be warmed up.

Control of the low-efficiency operation will be described in detail. The control unit 1500 controls the FC voltage by use of the DC/DC converter 300, and reduces the amount of the oxidation gas to be supplied to the fuel cell 400 to control the FC current. When the amount of the oxidation gas to be supplied is reduced in this manner, pumping hydrogen (described later) is generated in the cathode of the fuel cell 400. A generation mechanism of pumping hydrogen will hereinafter be described.

FIG. 7 is a diagram schematically showing a cell 400a constituting the fuel cell 400.

Each of the cells 400a includes an electrolytic film 400b, and an anode electrode and a cathode electrode which nip this electrolytic film 400b. A fuel gas including hydrogen (H$_2$) is supplied to an anode, and an oxidation gas including oxygen (O$_2$) is supplied to a cathode. When the fuel gas is supplied to the anode, a reaction of the following formula (11) progresses, and hydrogen is dissociated into a hydrogen ion and an electron. The hydrogen ion generated in the anode penetrates the electrolytic film 400b to move to the cathode, whereas the electron passes through an external circuit from the anode to move to the cathode.

Figure 7A:
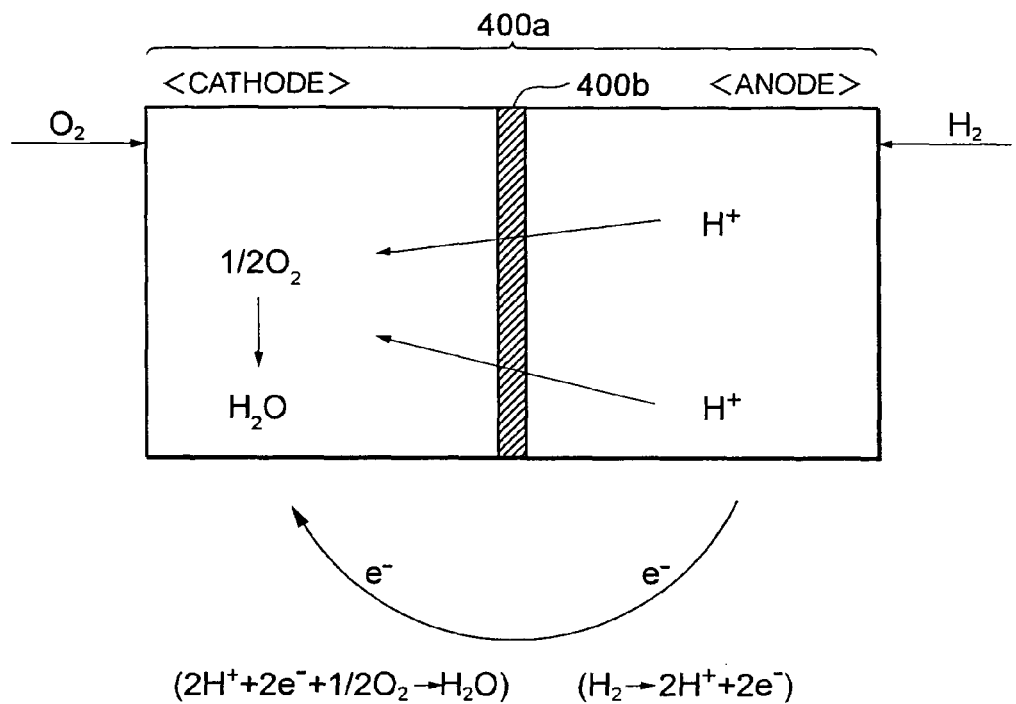
FIG. 7A is a diagram showing a cell reaction during the usual operation according to the embodiment.
Figure 7B:
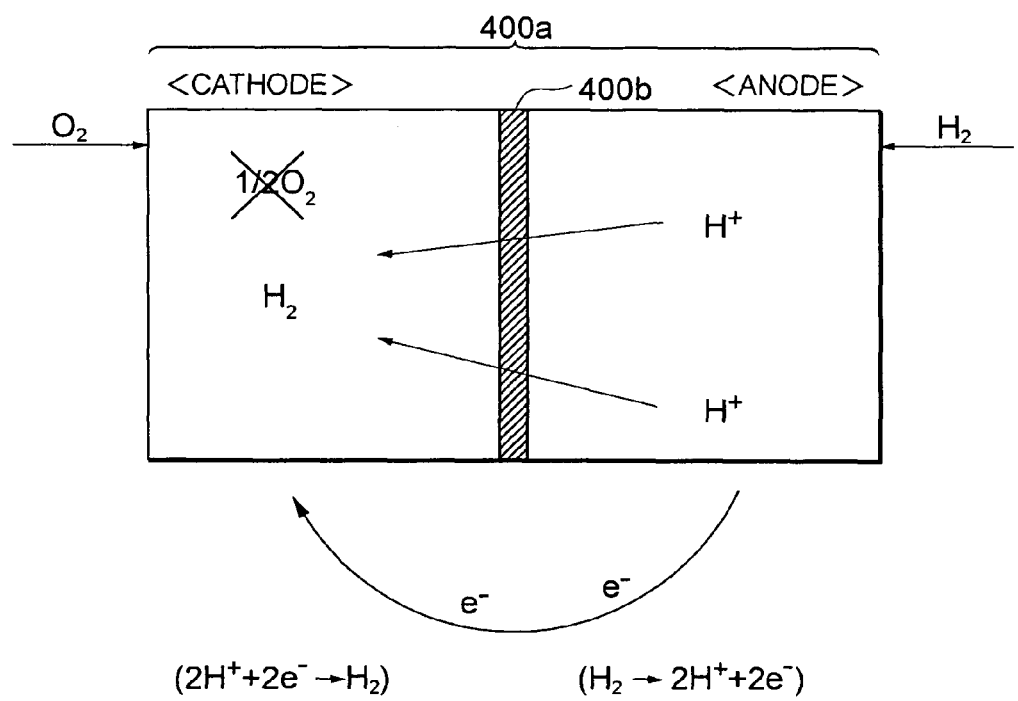
FIG. 7B is a diagram showing a cell reaction during the low-efficiency operation according to the embodiment.

Here, in a case where the oxidation gas is sufficiently supplied to the cathode, a reaction of the following formula (12) progresses to generate water from oxygen, the hydrogen ion and the electron (see FIG. 7A). On the other hand, in a case where the oxidation gas is insufficiently supplied to the cathode, a reaction of the following formula (13) progresses in accordance with an amount of a lacking oxidation gas, and the hydrogen ion is bonded to the electron again to generate hydrogen (see FIG. 7B). The generated hydrogen is discharged from the cathode together with an oxygen-off gas. When hydrogen generated in the cathode by bonding the dissociated hydrogen ion and electron to each other again, that is, an anode gas generated in the cathode is referred to as pumping hydrogen.

$$\text{anode: } H_2 \rightarrow 2H^+ + 2e^- \tag{11}$$

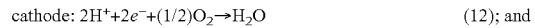

$$\text{cathode: } 2H^+ + 2e^- + (1/2)O_2 \rightarrow H_2O \tag{12; and}$$

$$\text{cathode: } 2H^+ + 2e^- \rightarrow H_2 \tag{13}.$$

Figure 8:
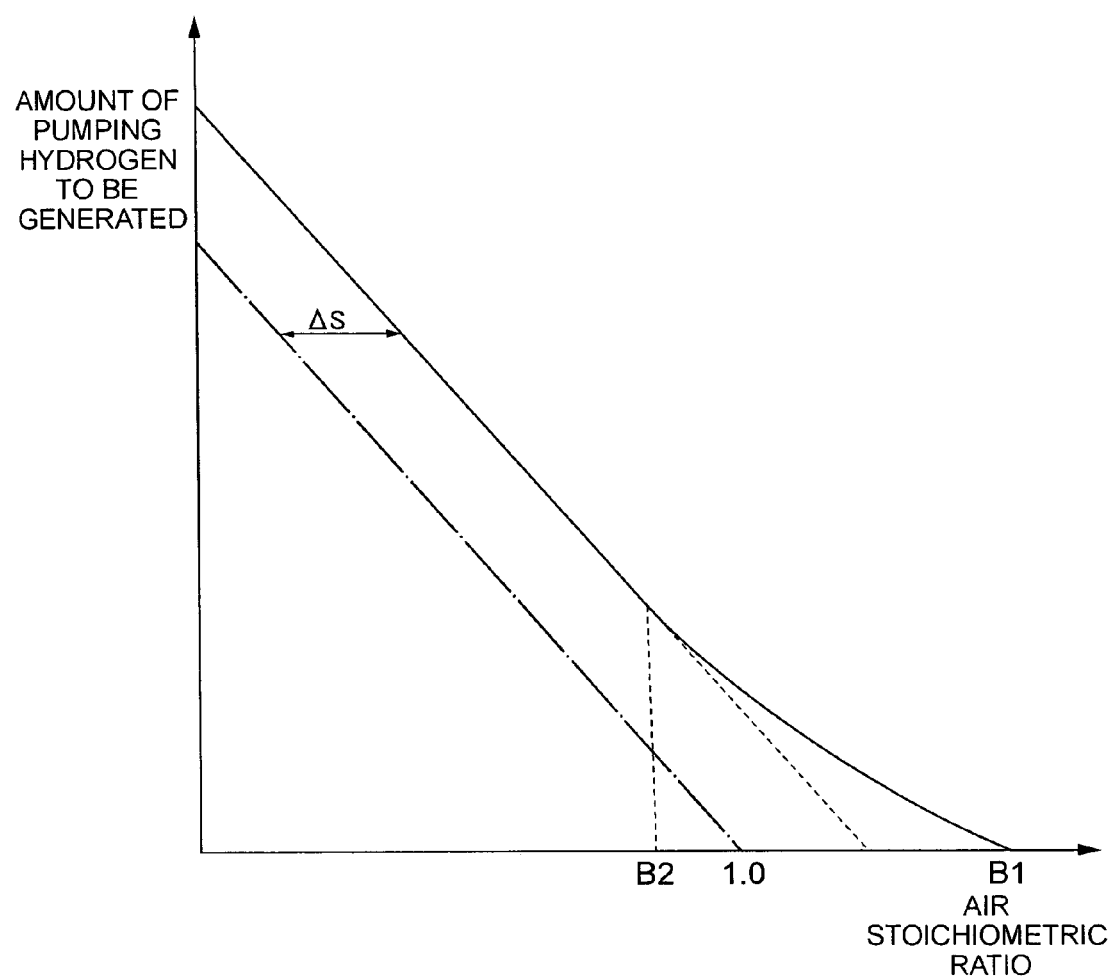
FIG. 8 is a diagram showing a relation between an air stoichiometric ratio and an amount of pumping hydrogen to be generated according to the embodiment.

FIG. 8 is a diagram showing a relation (a one-dot chain line; a theoretical value, a solid line; an actually measured value) between an air stoichiometric ratio and an amount of pumping hydrogen to be generated in the fuel cell. The ordinate indicates the amount of pumping hydrogen to be generated, and the abscissa indicates the air stoichiometric ratio. Here, the air stoichiometric ratio is a oxygen surplus ratio, and indicates a degree of surplus of oxygen to be supplied with respect to oxygen required for reaction without any excess or deficiency.

The theoretical amount of pumping hydrogen to be generated can be represented by the following equation (14). When the air stoichiometric ratio is below 1.0, the generation of pumping hydrogen theoretically starts. This theoretical amount of pumping hydrogen to be generated increases with a drop of the air stoichiometric ratio as shown by the following equation (14) and a one-dot chain line of FIG. 8.

$$Vt = (1 - St) * Ifc * \{n/(2*F)\} * 22.4 * 60 \tag{14},$$

in which Vt; the theoretical amount of pumping hydrogen to be generated;

St; the air stoichiometric ratio;

Ifc; an output current (a power generation characteristic);

F; Faraday constant; and n; the number of the cells.

The above amount is theoretically obtained, but actually, as shown by a solid line in FIG. 8, when the air stoichiometric ratio is larger than 1.0, the generation of pumping hydrogen starts. The present inventor estimated that there was a non-reacted oxygen content in the cell (oxygen which did not reach a reactive surface and was not reacted; a non-reacted cathode gas) as one of causes for a deviation generated between a theoretical value and an actually measured value, and evaluated the cells. As a result, it has been found that an offset amount Δs shown in FIG. 8 substantially agrees with the non-reacted oxygen content. It is to be noted that, since the offset amount Δs depends on characteristics (a material, a shape and the like) of the cells, the amount obtained beforehand by an experiment or the like may be used.

Furthermore, the present inventor estimated that there was an oxygen content which could not be supplied to the cells owing to distribution fluctuations among the cells (which are nearly equal to pressure loss fluctuations among the cells), and evaluated the cells. Specifically, the pressure loss during inspection of each manufactured cell to be shipped was substituted into the following equations (15) to (17), and a distribution ratio and the like were obtained to calculate the amount of pumping hydrogen to be generated. As a result, it has been found that the amount substantially agrees with that of a curved portion of a solid line.

$$D(i)=Plave/Pl(i) \quad (15);$$

$$B1=1/Dmin+\Delta s \quad (16); \text{ and}$$

$$B2=1/Dmax+\Delta s \quad (17),$$

in which D(i); a distribution ratio of an i-th cell;
Plave: an average pressure loss of the cells;
Pl(i); a pressure loss of the i-th cell;
Dmin; a minimum distribution ratio;
Dmax; a maximum distribution ratio;
B1; an air stoichiometric ratio at which generation of pumping hydrogen is started; and
B2; an air stoichiometric ratio at which a straight line intersects with a curved line.

This will more specifically be described. For example, when the average pressure loss Plave of the cells is 1.0, there is a fluctuation (0.8 to 1.2) of the pressure losses of ±20% among the cells and the offset amount Δs is 0.05, the minimum distribution ratio Dmin, the maximum distribution ratio Dmax, the air stoichiometric ratio B1 at which the generation of pumping hydrogen is started and the air stoichiometric ratio B2 at which the straight line intersects with the curved line are obtained as follows, respectively. It is to be noted that, in the present invention, the operation at the air stoichiometric ratio at which pumping hydrogen is generated is referred to as the low-efficiency operation, and the operation at the air stoichiometric ratio at which any pumping hydrogen is not generated is referred to as the usual operation.

$$Dmin=1/1.2;$$

$$Dmax=1/0.8;$$

$$B1=1/Dmin+\Delta s=1.2/1+0.05=1.25; \text{ and}$$

$$B2=1/Dmax+\Delta s=0.8/1+0.05=0.85.$$

As apparent from the above description, the actual amount of pumping hydrogen to be generated can more correctly be estimated in consideration of the non-reacted oxygen content in the cell and the oxygen content which could not be supplied owing to the distribution fluctuations. Specifically, the actual amount of pumping hydrogen to be generated at a stoichiometric ratio X can be estimated by the following equation (18).

$$Vm = \sum_{i=1}^{n} \{1 + \Delta S - D(i) * X\} * \frac{I_{fc}}{(2*F)} * 22.4 * 60 \quad (18)$$

As described above, according to the present embodiment, the actual amount of pumping hydrogen to be generated in the cathode can more correctly be estimated in consideration of the non-reacted oxygen content in the cell and the oxygen content which could not be supplied owing to the distribution fluctuations.

<Modification>

In the above embodiment, pumping hydrogen is detected using the above equation (18) and the like. However, for example, a cathode-off gas channel to which pumping hydrogen is to be discharged may be provided with a hydrogen sensor, and detection of pumping hydrogen by a hydrogen sensor and detection of pumping hydrogen by use of the above equation (18) or the like may both be performed.

Moreover, in the above embodiment, the amount of pumping hydrogen to be generated has been estimated in consideration of the non-reacted oxygen content in the cell and the oxygen content which could not be supplied owing to the distribution fluctuations, but the amount of pumping hydrogen to be generated may be estimated in consideration of at least one of them.

For example, in a case where the only non-reacted oxygen content in the cell is considered, the amount of pumping hydrogen to be generated can be estimated according to the following equation (18)'. On the other hand, in a case where the only oxygen content that could not be supplied owing to the distribution fluctuations is considered, the amount of pumping hydrogen to be generated can be estimated according to the following equation (18)".

$$Vm = \sum_{i=1}^{n} \{1 + \Delta S - D(i)\} * \frac{I_{fc}}{(2*F)} * 22.4 * 60; \quad (18)'$$

and $$Vm = \sum_{i=1}^{n} \{1 - D(i) * X\} * \frac{I_{fc}}{(2*F)} * 22.4 * 60. \quad (18)''$$

Moreover, in the above embodiment, in a case where a fuel cell 400 is warmed-up, the cell is operated at a low-efficiency operation point, but in a case where a catalyst activity of the fuel cell 400 is restored, the cell may be operated at the low-efficiency operation point.

For example, in a case where it is detected that an electrode catalyst of the fuel cell 400 is brought into a poisoned state, the cell may be operated at the low-efficiency operation point. After the cell is once operated at the low-efficiency operation point during starting of a system, the point may be shifted to a usual operation point. Furthermore, when a power required for the system is not more than a predetermined value (e.g., in the vicinity of an idle output), a usual operation point may be shifted to the low-efficiency operation point. Furthermore, after stop of the system, the operation may be performed at the low-efficiency operation point to restore the catalyst activity deteriorated during the operation and prepare for the next start.

C. Third Embodiment

Figure 9:
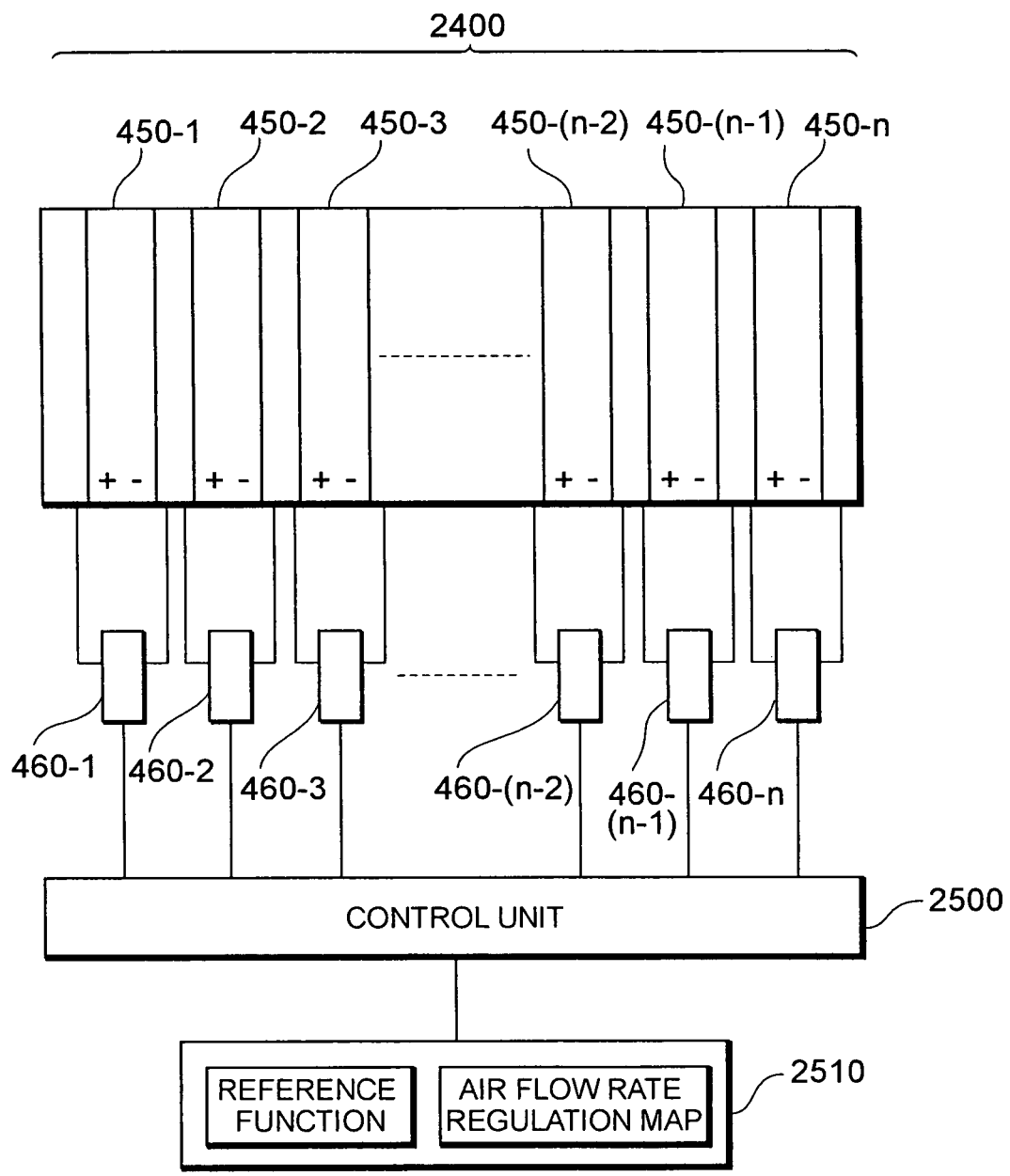
FIG. 9 is a diagram showing a constitution around a fuel cell according to a third embodiment.

FIG. 9 is a diagram showing a constitution around a fuel cell according to a third embodiment. In the same manner as in the above embodiments, even in the third embodiment, a fuel cell system is assumed which is to be mounted on vehicles such as a fuel cell car (FCHV), an electric car and a hybrid car, but the system is also applicable to not only the vehicles but also various mobile objects (e.g., a ship, an airplane, a robot, etc.) and a stationary power source.

A fuel cell 2400 shown in FIG. 9 is provided with a cell monitor 460-$k$ (1≤$k$≤n) for each cell 450-$k$ (1≤$k$≤n). The present embodiment is characterized in that an amount of pumping hydrogen to be generated (or a concentration of pumping hydrogen) is estimated based on a cell voltage detected by the cell monitor 460-k. This will hereinafter be described in detail.

Each cell monitor 460-k detects a voltage value (the cell voltage) of the corresponding cell 450-k to supply the value to a control unit 2500. On receiving the cell voltage from each cell monitor 460-k, the control unit 2500 estimates the amount of pumping hydrogen to be generated in each cell with reference to a reference function stored in a memory 2510.

Figures 10, 11:
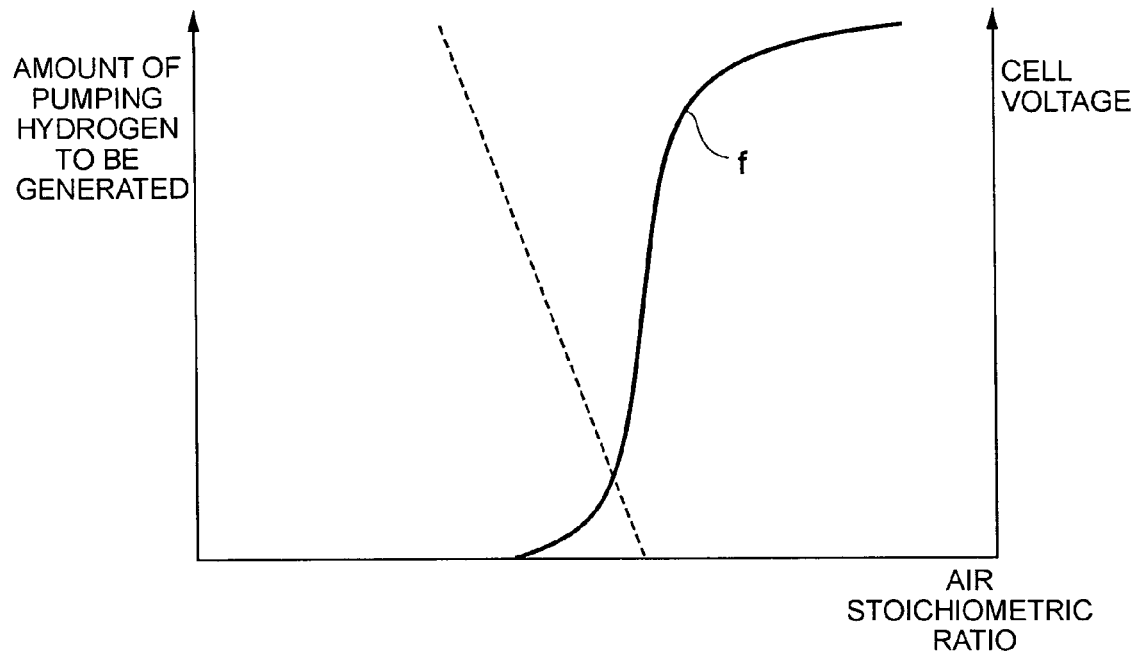
FIG. 10 is an explanatory view of a reference function according to the embodiment.
FIG. 11 is a diagram showing an air flow rate regulation map according to the embodiment.

FIG. 10 is an explanatory view of the reference function stored in the memory 2510. The left ordinate indicates the amount of pumping hydrogen to be generated, the right ordinate indicates the cell voltage, and the abscissa indicates the air stoichiometric ratio.

A relation among the amount of pumping hydrogen to be generated, the cell voltage and the air stoichiometric ratio is obtained by evaluating a predetermined cell (hereinafter referred to as a reference cell) during manufacturing and shipping. Moreover, based on this evaluation result, the reference function to obtain the amount of pumping hydrogen to be generated from the cell voltage in the reference cell is derived (see equation (19)), and stored in the memory 2510.

$$Fs = f(Vs) \quad (19),$$

in which Fs: the amount of pumping hydrogen to be generated in the reference cell;

Vs: the cell voltage in the reference cell; and f: the reference function (an arbitrary approximate function).

On receiving the cell voltage from each cell monitor 460-k, the control unit (estimation means) 2500 substitutes each cell voltage into the reference function f shown in the above equation (19) to thereby estimate the amount of pumping hydrogen to be generated in each cell (see equation (20)). Moreover, the obtained amounts of pumping hydrogen to be generated in the cells are added up to thereby estimate the amount of pumping hydrogen to be generated in the whole fuel cell (see equation (21)).

$$Fk = f(Vk) \quad (20),$$

in which Fk; the amount of pumping hydrogen to be generated in a k-th cell; and

Vk; the cell voltage in the k-th cell.

$$Fp = \sum_{k=1}^{n} Fk \quad (21)$$

The control unit 2500 divides the amount of pumping hydrogen to be generated in the whole fuel cell by an air flow rate (an oxidation off gas) on a cathode outlet side of the fuel cell 2400 to thereby calculate a pumping hydrogen concentration (see equation (22)). It is to be noted that the air flow rate on the cathode outlet side may be detected by a flow rate meter arranged on the cathode outlet side, but may be detected by another method.

$$Dh = Fp/\text{Fair} \quad (22),$$

in which Fair; the air flow rate on the cathode outlet side.

On calculating the pumping hydrogen concentration, the control unit 2500 accesses an air flow rate regulation map mp stored in the memory 2510 (see FIG. 11), and regulates the flow rate of an oxidation gas to be supplied to the fuel cell 2400. One example will be described. For example, in a case where a pumping hydrogen concentration Dh is higher than a first threshold value Dth1, the control unit 2500 increases the flow rate of the oxidation gas to be supplied to the fuel cell 2400 so as to lower the pumping hydrogen concentration. On the other hand, in a case where the pumping hydrogen concentration Dh is lower than a second threshold value Dth2, the unit decreases the flow rate of the oxidation gas to be supplied to the fuel cell 2400 so as to increase the pumping hydrogen concentration. In addition, in a case where the pumping hydrogen concentration Dh is not less than the second threshold value Dth2 and not more than the first threshold value Dth1, the unit judges that the pumping hydrogen concentration falls in an adequate range, and does not change the flow rate of the oxidation gas to be supplied to the fuel cell 2400.

As described above, according to the present embodiment, the cell voltage can be detected to thereby obtain the amount of pumping hydrogen to be generated and the pumping hydrogen concentration. Therefore, a sensor for detection does not have to be separately arranged, and the number of components and manufacturing costs can be reduced.

D. Fourth Embodiment

Figure 12:
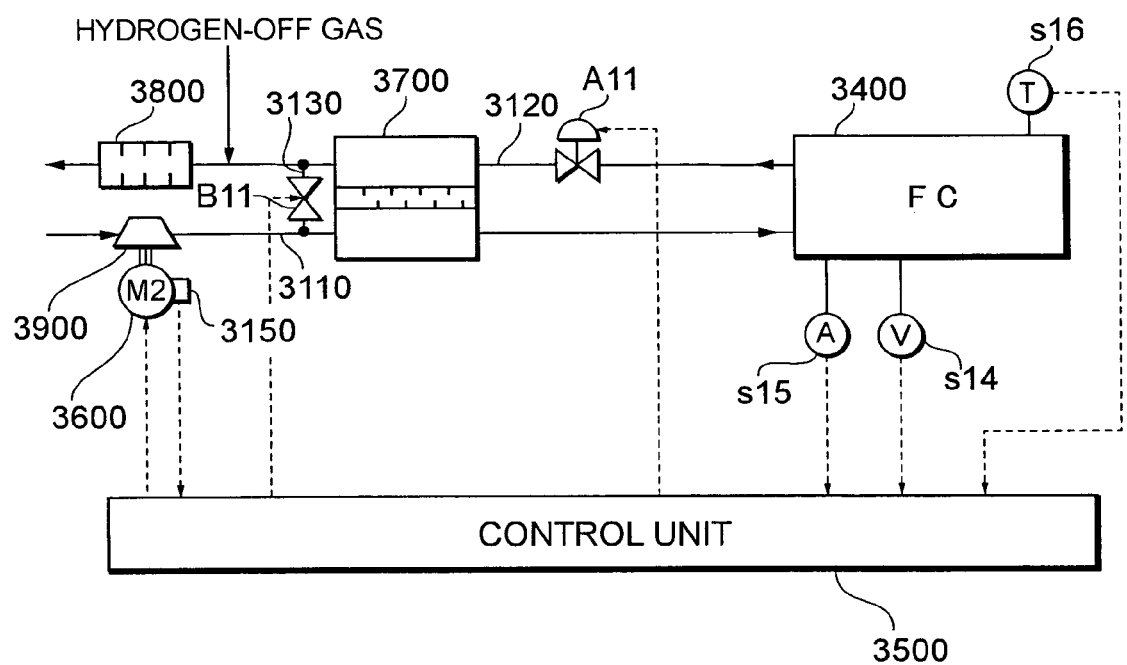
FIG. 12 is a diagram showing a constitution around a fuel cell according to a fourth embodiment.

FIG. 12 is a diagram showing a constitution around a fuel cell according to a fourth embodiment. In the same manner as in the above embodiments, even in the fourth embodiment, a fuel cell system is assumed which is to be mounted on vehicles such as a fuel cell car (FCHV), an electric car and a hybrid car, but the system is also applicable to not only the vehicles but also various mobile objects (e.g., a ship, an airplane, a robot, etc.) and a stationary power source.

A fuel cell 3400 is means for generating a power from a supplied reactive gas (a fuel gas and an oxidation gas), and has a stack structure in which a plurality of single cells including an MEA (a film/electrode bonded material) and the like are laminated in series. Specifically, fuel cells of various types such as a solid polymer type, a phosphoric acid type and a dissolving carbonate type may be used.

An air compressor 3900 supplies oxygen (an oxidation gas) taken from outside air via an air filter (not shown) to a cathode pole of the fuel cell 3400. An air compressor motor 3600 is a motor which regulates an amount of the oxidation gas to be supplied (a discharge amount) by the air compressor 3900, and the number of revolutions of the motor is controlled in accordance with the instructed number of the revolutions given from a control unit 3500.

In addition, a cathode-off gas is discharged from a cathode of the fuel cell 3400. The cathode-off gas includes not only an oxygen-off gas subjected to a cell reaction of the fuel cell 3400 but also pumping hydrogen to be generated on a cathode side and the like. This cathode-off gas includes a water content generated by the cell reaction of the fuel cell 3400, and is therefore brought into a highly wet stage. It is to be noted that, since details of a generation mechanism of pumping hydrogen and the like have been clarified in the above embodiments, they are omitted here.

A humidification module 3700 exchanges the water content between a less wet oxidation gas flowing through an oxidation gas supply path 3110 and a highly wet cathode-off gas flowing through a cathode-off gas channel 3120 to appropriately humidify the oxidation gas to be supplied to the fuel cell 3400. A back pressure of the oxidation gas to be supplied to the fuel cell 3400 is regulated by an air pressure regulation valve All arranged in the vicinity of a cathode outlet of the cathode-off gas channel 3120.

Here, the oxidation gas supply path 3110 extending from the air compressor 3600 to the humidification module 3700 is connected to the cathode-off gas channel 3120 extending from the humidification module 3700 to a dilution unit 3800 via a bypass valve B11. The bypass valve B11 and a bypass passage 3130 are means for allowing a part of the oxidation gas flowing through the oxidation gas supply path 3110 to pass by the fuel cell 3400 and introducing the part into the cathode-off gas channel 3120, and an amount of the oxidation gas to be bypassed is regulated by a control unit (control means, regulation means) 3500. It is to be noted that in the following description, the oxidation gas to be bypassed is referred to as bypass air.

The dilution unit 3800 dilutes the gas so that a concentration of the hydrogen gas to be discharged falls in a preset concentration range (a range determined based on an environment standard or the like). This dilution unit 3800 communicates with downstream sides of the cathode-off gas channel 3120 and the anode-off gas channel (not shown), and mixes and dilutes a hydrogen-off gas, pumping hydrogen, an oxygen-off gas and the bypass air to exhaust the gas from the system.

The control unit 3500 includes a CPU, an ROM, an RAM and the like, and centrally controls sections of the system based on input sensor signals. Specifically, the unit obtains an output required power of the fuel cell 3400 based on an accelerator pedal sensor which detects an open degree of an accelerator pedal, an SOC sensor which detects a state of charge (SOC) of a battery and the like. In addition, the unit controls valve open degrees of the air pressure regulation valve A11 and the bypass valve B11, and controls the number of revolutions (i.e., an instructed flow rate of the oxidation gas) of the air compressor motor 3600 and the like based on sensor signals input from a voltage sensor s14, a current sensor s15, a temperature sensor s16, a sensor 3150 and the like which detect an output voltage, an output current, and an internal temperature of the fuel cell 3400, and a condition of the air compressor motor 3600 respectively. It is to be noted that a fuel cell system according to the present embodiment performs two types of low-efficiency operations in accordance with an amount of pumping hydrogen to be generated as described later.

Figure 13:
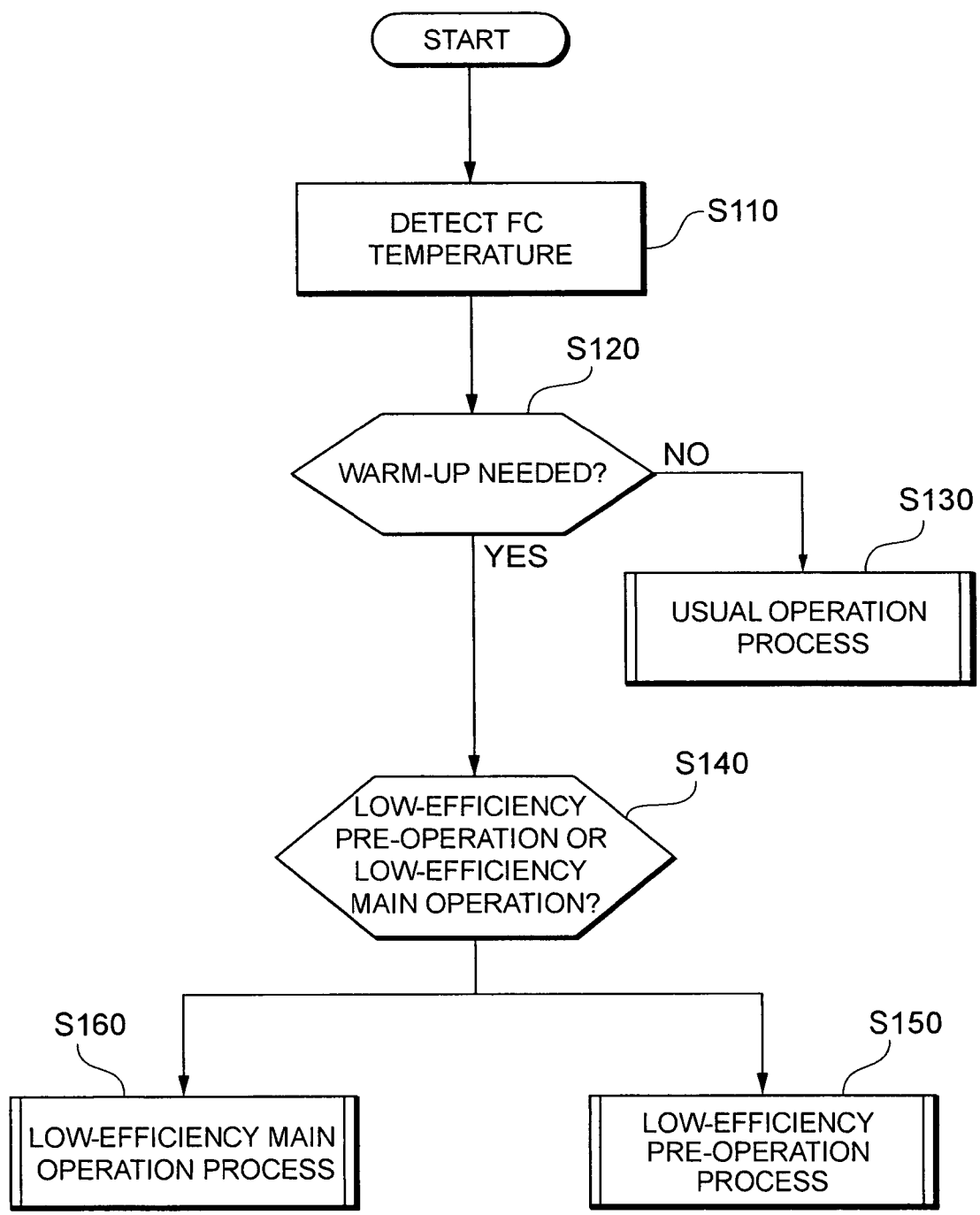
FIG. 13 is a flow chart showing an operation according to the embodiment.

FIG. 13 is a flow chart showing an operation of the fuel cell system according to the present embodiment.

The control unit 3500 detects a temperature (an FC temperature) of the fuel cell 3400 based on the sensor signal output from the temperature sensor s16 (step S110). The control unit 3500 compares the detected FC temperature with a reference temperature registered in a memory (not shown) to thereby judge whether or not warm-up is needed (step S120). On judging that the FC temperature exceeds a reference temperature and that the warm-up is not necessary, the control unit 3500 performs a usual operation process (step S130). Here, the usual operation process is a process in which the system is operated at a highly efficient operation point (i.e., an operation point with a small power loss) without being warmed up.

Figure 14:
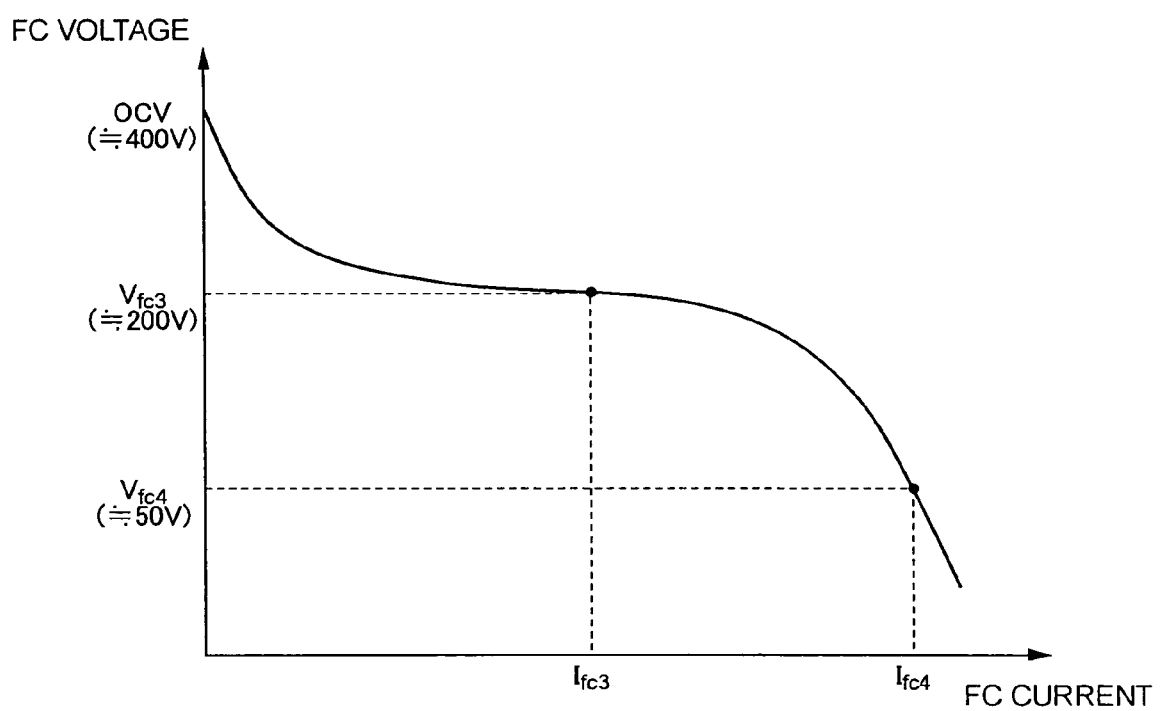
FIG. 14 is an explanatory view of each operation point according to the embodiment.

On the other hand, on judging that the FC temperature is not more than a reference temperature and that the warm-up is necessary, the control unit 3500 advances to a step S140 to judge whether to perform a low-efficiency pre-operation or a low-efficiency main operation. Here, the low-efficiency main operation is a low-efficiency operation (see the description of the second embodiment, FIG. 6 and the like) heretofore performed during the warm-up. The low-efficiency pre-operation is an operation performed at an operation point (see (Ifc3, Vfc3) shown in FIG. 14) having a power loss which is smaller than that of the low-efficiency main operation and larger than that of the usual operation. For example, when OCV of the fuel cell 3400 is about 400 V as shown in FIG. 14, the FC voltage Vfc3 at the low-efficiency pre-operation point is about 200 V (a fixed value in the present embodiment), and the FC voltage Vfc4 at the low-efficiency main operation point is about 50 V. As apparent from this description, since the power loss of the low-efficiency pre-operation is smaller than that of the low-efficiency main operation, a temperature rise rate of the fuel cell 3400 during the low-efficiency pre-operation is lower than that during the low-efficiency main operation.

In the present embodiment, the control unit 3500 judges that the low-efficiency pre-operation should be performed in a case where the vehicle is running, and judges that the low-efficiency main operation should be performed in a case where the vehicle is stopped (including a starting time). In addition, this judgment standard is an only one example, and it may be judged whether to perform the low-efficiency pre-operation or the low-efficiency main operation based on a temperature difference between the FC temperature and the reference temperature. Specifically, in a case where a temperature difference between the FC temperature and the reference temperature exceeds a set threshold value, the low-efficiency main operation is performed. On the other hand, when the temperature difference is not more than the set threshold value, the low-efficiency pre-operation is performed. The standard by which it is judged whether to perform the low-efficiency main operation or the low-efficiency pre-operation in this manner can appropriately be set in accordance with system design or the like.

On judging that the low-efficiency main operation should be performed because the vehicle stops, the control unit 3500 advances to step S150 to perform the low-efficiency main operation. Specifically, an FC current value and an FC voltage value are determined from a power (an FC required power) required for the fuel cell 3400 and an amount of heat (a power loss) required for the warm-up, and the operation is performed at an operation point corresponding to the determined FC current instruction value and FC voltage instruction value (refer to the second embodiment for the details).

On the other hand, on judging that the low-efficiency pre-operation should be performed because the vehicle runs, the control unit 3500 advances to step S160 to perform the low-efficiency pre-operation.

Figure 15:
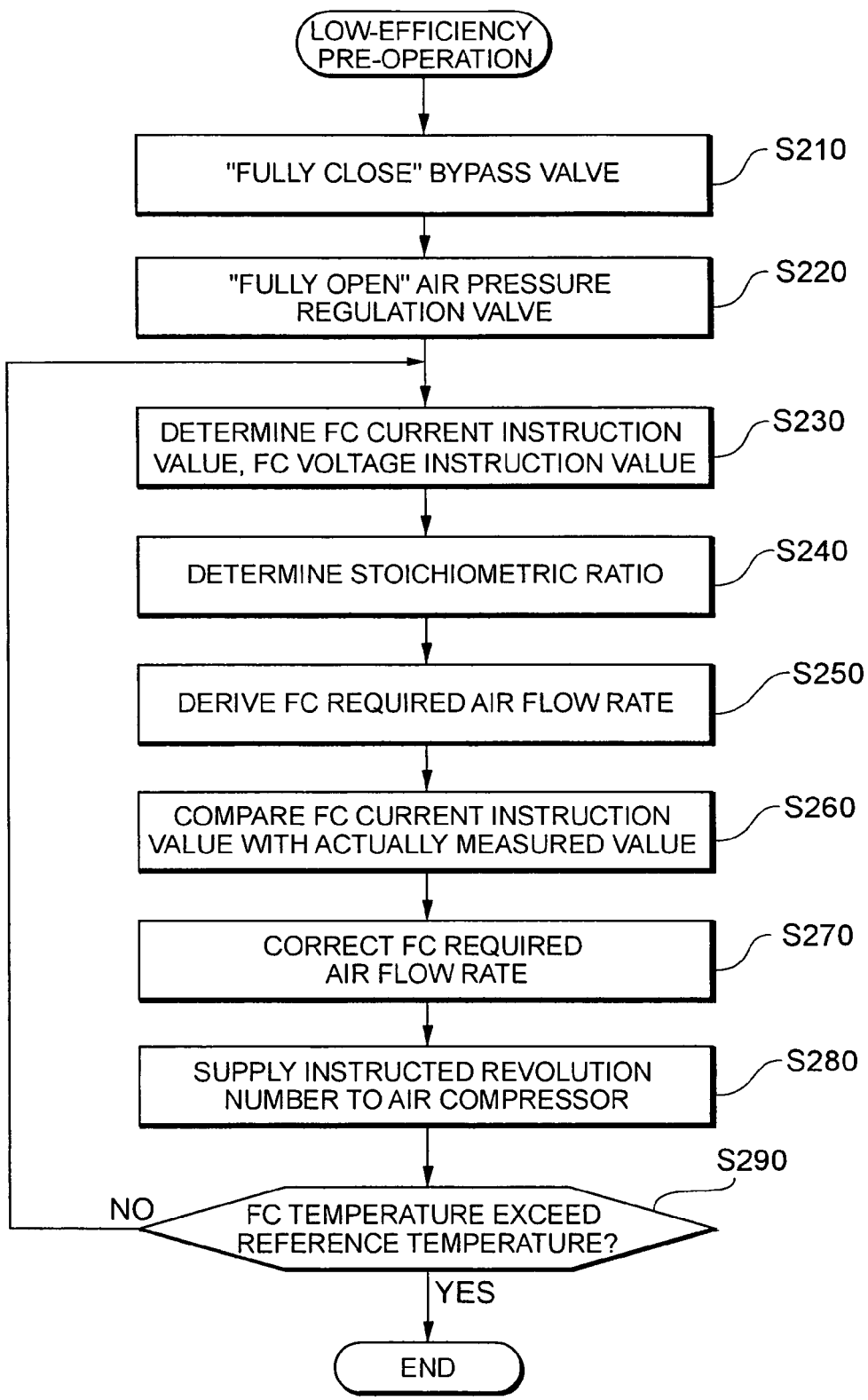
FIG. 15 is a flow chart showing an operation of a pre-operation with a low efficiency according to the embodiment.

FIG. 15 is a flow chart showing an operation of the low-efficiency pre-operation.

The control unit 3500 first sets a valve open degree of the bypass valve B11 to a "fully closed" degree, and sets a valve open degree of the air pressure regulation valve A11 to a "fully opened" degree (step S210→step S220). Here, a reason why the valve open degree of the bypass valve B11 is set to the "fully closed" degree is that the amount of pumping hydrogen to be generated during the low-efficiency pre-operation is small and the gas does not have to be diluted with a non-reacted oxidation gas. In other words, the operation point during the low-efficiency pre-operation is controlled so as to reduce the amount of pumping hydrogen to be generated (the amount falls in a regulated range without being diluted).

On regulating the valve open degrees of the bypass valve B11 and the air pressure regulation valve A11 as described above, the control unit 3500 reads out the operation point for the low-efficiency pre-operation registered beforehand in a memory (not shown) (see FIG. 14) to determine an FC current instruction value and an FC voltage instruction value (step S230).

Moreover, the control unit 3500 determines the air stoichiometric ratio based on the determined FC current instruction value. To describe this in detail, the control unit 3500 determines the stoichiometric ratio corresponding to the determined FC current instruction value with reference to an FC current-air stoichiometric ratio map showing a relation between the FC current instruction value stored beforehand in the memory or the like and the air stoichiometric ratio (step S240). Moreover, the control unit 3500 substitutes a determined air stoichiometric ratio Ap into the following equation (22) to thereby obtain an FC required air flow rate Ar (step S250).

$$Ar = Ac * Ap/(96500*4) \quad (22),$$

in which Ap; an amount of oxygen to be consumed by the FC.

It is to be noted that the amount Ap of oxygen to be consumed by the FC is determined in accordance with the FC current instruction value and the number of the cells constituting the fuel cell.

Moreover, the control unit 3500 compares the FC current instruction value with the FC current value (an actually measured value) detected by the current sensor s15 to obtain a difference (step S260). The control unit 3500 corrects the FC required air flow rate based on the difference obtained in this manner (step S270). Moreover, the control unit 3500 obtains the number of revolutions of the air compressor motor 3600 from the corrected FC required air flow rate (an instructed oxidation gas flow rate), and supplies this number as the instructed number of the revolutions to the air compressor motor 3600 to thereby control the current of the fuel cell 3400 (step S280).

When such control is performed, the control unit 3500 judges, based on the sensor signal supplied from the temperature sensor s16, whether or not the detected FC temperature exceeds the reference temperature, that is, the warm-up may be ended (step S290). When the FC temperature does not exceed the reference temperature, the control unit 3500 returns to the step S230 to continue the warm-up of the system, and repeatedly executes a series of processes described above. On the other hand, when the FC temperature exceeds the reference temperature, the control unit 3500 judges that the system does not have to be warmed up any more, and the above description is ended.

As described above, according to the present embodiment, during the low-efficiency pre-operation in which pumping hydrogen does not have to be diluted, the bypass valve is fully closed, the air pressure regulation valve is fully opened, and the flow rate of air to be supplied by the air compressor is controlled to control the FC current. In consequence, simple control can be performed as compared with the usual operation and the low-efficiency main operation in which the FC current is controlled by use of the air pressure regulation valve and the air compressor.

<Modification>

(1) In the above embodiment, during the low-efficiency pre-operation, the bypass valve is fully closed, the air pressure regulation valve is fully opened, and the flow rate of air to be supplied by the air compressor is controlled to control the FC current. However, the present invention is not limited to this embodiment. The valve open degrees of the bypass valve and the air pressure regulation valve may be set to be constant, and the flow rate of air to be supplied by the air compressor may be controlled to control the FC current.

(2) Moreover, in the above embodiment, the FC temperature has been detected to judge whether or not the system needs to be warmed up, but instead of the FC temperature, an outside air temperature and a temperature of a component around the fuel cell may be detected to judge whether or not the system needs to be warmed up.

(3) Furthermore, in the above embodiment, the low-efficiency pre-operation point is fixed, but the low-efficiency pre-operation point may be changed in a range in which the amount of pumping hydrogen to be generated falls in a regulated range.

The invention claimed is:

1. A fuel cell system which selectively executes a first operation with a first efficiency and a low-efficiency operation with a second efficiency lower than the first efficiency, comprising:
    a regulation device programmed to regulate a dilution amount of a gas to be discharged from a cathode in accordance with a gas amount of an anode gas included in the gas to be discharged from the cathode of a fuel cell during the low-efficiency operation, wherein the anode gas included in the gas to be discharged from the cathode is a hydrogen gas to be generated in the cathode of the fuel cell during the low-efficiency operation, and
    an estimation device programmed to estimate the gas amount of the hydrogen gas to be generated in the cathode of the fuel cell during the low-efficiency operation.

2. The fuel cell system according to claim 1, further comprising:
    a bypass passage which allows a part of a cathode gas flowing through a gas supply path of the fuel cell to pass by the fuel cell and which introduces the part into a discharge passage,
    a bypass valve which controls a gas amount of the cathode gas to be bypassed,
    wherein the regulation device controls the bypass valve in accordance with the gas amount of the hydrogen gas included in the gas to be discharged from the cathode of the fuel cell.

3. The fuel cell system according to claim 2, wherein the regulation device controls the bypass valve so that a discharge concentration of hydrogen to be discharged from the fuel cell system is not more than a reference value.

4. The fuel cell system according to claim 2, wherein the cathode gas to be supplied to the cathode of the fuel cell is an oxidation gas including oxygen,
    the fuel cell system further comprising:
    an oxidation gas supply source which discharges the oxidation gas in accordance with a given instruction; and
    a control device programmed to control an amount of the oxidation gas to be discharged by the oxidation gas supply source based on an amount of the oxidation gas required for power generation of the fuel cell and an amount of the oxidation gas to be allowed to pass by the fuel cell.

5. The fuel cell system according to claim 4, the system further comprising:
    a pressure regulation valve which controls the amount of the oxidation gas to be supplied from the oxidation gas supply source to the cathode of the fuel cell,
    wherein during the low-efficiency operation, in a case where the amount of the hydrogen gas to be generated in the cathode of the fuel cell is not more than the reference value, the regulation device fully closes the bypass valve whereas the control device controls the amount of the oxidation gas to be discharged while keeping an open degree of the pressure regulation valve to be constant in accordance with the amount of the oxidation gas required for the power generation of the fuel cell.

6. The fuel cell system according to claim 5, wherein the oxidation gas supply source is an air compressor, and during the low-efficiency operation, in a case where the amount of the hydrogen gas to be generated in the cathode of the fuel cell is not more than the reference value, the control device controls the amount of the oxidation gas to be discharged while keeping the pressure regulation valve to be fully opened in accordance with the amount of the oxidation gas required for the power generation of the fuel cell.

7. The fuel cell system according to claim 1, wherein the estimation device is further programmed to estimate the amount of hydrogen based on an output current of the fuel cell, an air stoichiometric ratio of the fuel cell and a temperature of the fuel cell.

* * * * *

UNITED STATES PATENT AND TRADEMARK OFFICE
CERTIFICATE OF CORRECTION

PATENT NO. : 8,597,848 B2  Page 1 of 1
APPLICATION NO. : 11/992587
DATED : December 3, 2013
INVENTOR(S) : Imanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1147 days.

Signed and Sealed this
Twenty-second Day of September, 2015

Michelle K. Lee
*Director of the United States Patent and Trademark Office*